US012639651B2

(12) United States Patent
Peng et al.

(10) Patent No.: US 12,639,651 B2
(45) Date of Patent: May 26, 2026

(54) RECOMMENDATION SYSTEM WITH TIME SERIES DATA GENERATED IMPLICIT RATINGS

(71) Applicant: Microsoft Technology Licensing, LLC, Redmond, WA (US)

(72) Inventors: Cheng Peng, Thousand Oaks, CA (US); Gordan Kuvac, Renton, WA (US); Pedro Simoes Trindade, Tampa, FL (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 223 days.

(21) Appl. No.: 18/187,417

(22) Filed: Mar. 21, 2023

(65) Prior Publication Data

US 2024/0320589 A1      Sep. 26, 2024

(51) Int. Cl.
*G06Q 10/0637*       (2023.01)
*G06F 18/2415*       (2023.01)

(52) U.S. Cl.
CPC ..... *G06Q 10/0637* (2013.01); *G06F 18/2415* (2023.01)

(58) Field of Classification Search
CPC ........... G06Q 10/0637; G06Q 30/0282; G06Q 30/0631; G06F 18/2415
See application file for complete search history.

(56) References Cited

U.S. PATENT DOCUMENTS

| | | | | |
|---|---|---|---|---|
| 6,606,744 B1 * | 8/2003 | Mikurak | .............. | H04Q 3/0062 |
| | | | | 717/174 |
| 7,124,101 B1 * | 10/2006 | Mikurak | ............ | G06Q 10/0631 |
| | | | | 705/7.12 |
| 7,747,478 B2 * | 6/2010 | Agrawal | .............. | G06Q 10/087 |
| | | | | 705/28 |
| 8,244,564 B2 * | 8/2012 | Selinger | ............ | G06Q 30/0643 |
| | | | | 705/7.11 |

(Continued)

OTHER PUBLICATIONS

Mansoury, Masoud, "Understanding and Mitigating Multi-Sided Exposure Bias in Recommender Systems", Eindhoven: Technische Universiteit Eindhoven, 2021, (Year: 2021).*

(Continued)

*Primary Examiner* — Amber A Misiaszek
(74) *Attorney, Agent, or Firm* — Weaver IP L.L.C.

(57)      ABSTRACT

A recommendation system generates recommendations for data subjects. A plurality of time series data that includes a set of time series data corresponding to each data subject of a plurality of data subjects are received. Data subjects are segmented into groups according to a clustering algorithm applied to the sets of time series data. Implicit ratings for the data subjects are determined. The implicit ratings include an implicit rating determined for each data subject based on a group into which the data subject is segmented. A recommendation for a first data subject of the plurality of data subjects is generated using a neural network model based on the determined implicit ratings. The recommendation includes an actionable insight associated with the first data (Continued)

<u>100</u>

Server <u>106A</u>
Data Collection Service <u>112</u>

Server <u>106B</u>
Clustering Service <u>114</u>

• • •

Server <u>106N</u>
Recommendation Service <u>116</u>

User Computing Device <u>102A</u>

User Computing Device <u>102B</u>

User Computing Device <u>102C</u>

•
•
•

User Computing Device <u>102N</u>

Network <u>110</u>

Data Store(s) <u>108</u>
Time Series Data <u>120</u>

Admin Computing Device <u>104</u>
Admin User Interface <u>118</u> subject. In a further example, the neural network model is a deep recommendation model.

20 Claims, 6 Drawing Sheets

(56)                    References Cited

U.S. PATENT DOCUMENTS

| | | | | |
|---|---|---|---|---|
| 2006/0178918 | A1* | 8/2006 | Mikurak ................ | G06Q 10/06 |
| | | | | 705/7.31 |
| 2014/0236663 | A1* | 8/2014 | Smith ................ | G06Q 10/0633 |
| | | | | 705/7.27 |
| 2016/0171511 | A1* | 6/2016 | Goel ................. | G06Q 30/0201 |
| | | | | 705/7.29 |
| 2021/0142385 | A1* | 5/2021 | Alahmady ......... | G06Q 30/0631 |
| 2022/0350809 | A1* | 11/2022 | Bradley ............. | G06F 16/2272 |

OTHER PUBLICATIONS

Charu C Aggarwal, "Neural Networks and Deep Learning : a textbook", Springer, Aug. 26, 2018, 389 pages.
International Search Report and Written Opinion received for PCT Application No. PCT/US2024/019304, Jun. 19, 2024, 13 pages.
International Preliminary Report On Patentability received for PCT Application No. PCT/US2024/019304, mailed on Oct. 2, 2025, 08 pages.

\* cited by examiner

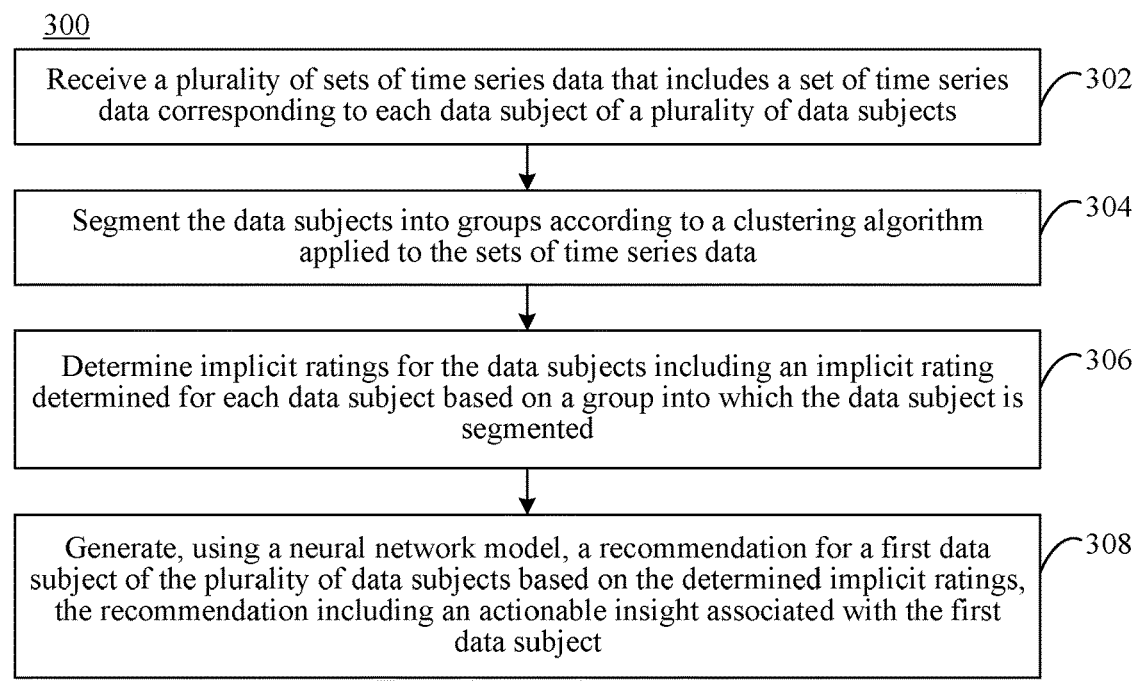

300

| | |
|---|---|
| Receive a plurality of sets of time series data that includes a set of time series data corresponding to each data subject of a plurality of data subjects | 302 |
| Segment the data subjects into groups according to a clustering algorithm applied to the sets of time series data | 304 |
| Determine implicit ratings for the data subjects including an implicit rating determined for each data subject based on a group into which the data subject is segmented | 306 |
| Generate, using a neural network model, a recommendation for a first data subject of the plurality of data subjects based on the determined implicit ratings, the recommendation including an actionable insight associated with the first data subject | 308 |

FIG. 3

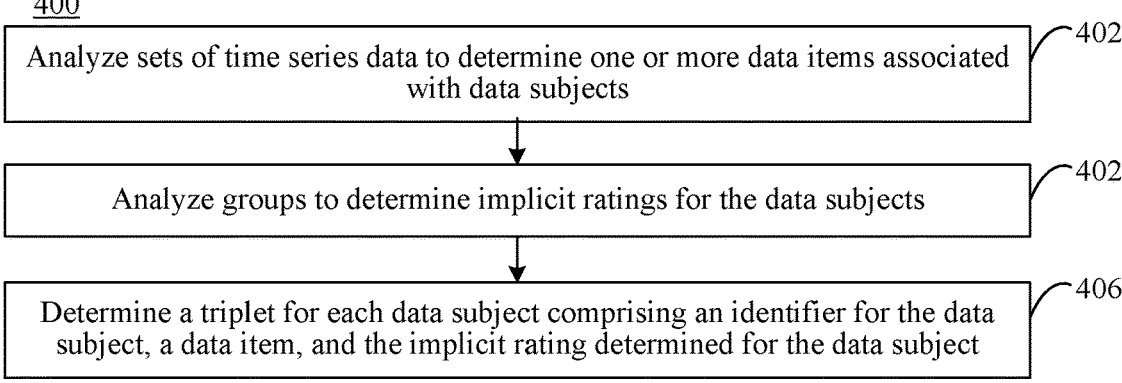

400

| | |
|---|---|
| Analyze sets of time series data to determine one or more data items associated with data subjects | 402 |
| Analyze groups to determine implicit ratings for the data subjects | 402 |
| Determine a triplet for each data subject comprising an identifier for the data subject, a data item, and the implicit rating determined for the data subject | 406 |

FIG. 4

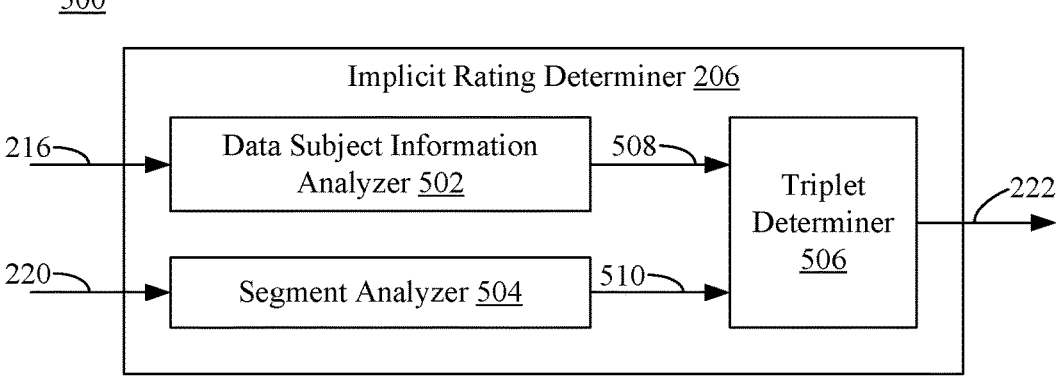

| Rank | Item(s) | Ranking Score |
|------|---------|---------------|
| 1 | Industry 1, Region A | 4.80 |
| 2 | Industry 2, Region B | 4.55 |
| 3 | Industry 1, Region D | 4.37 |
| 4 | Industry 3, Region B | 4.35 |
| 5 | Industry 2, Region C | 4.32 |

RECOMMENDATION SYSTEM WITH TIME SERIES DATA GENERATED IMPLICIT RATINGS

BACKGROUND

A business is an entity (e.g., an enterprise) that buys and/or sells products, including goods and services, to generate revenue. A particular business may buy or sell products in any number of markets. Such markets may be subdivided in various ways, including geographically (e.g., regions of the world), by type of good or service (e.g., high technology, consumer goods, banking, mining, etc.). A business having proficiency in one market may desire to enter other markets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable the generation of recommendations with implicit ratings generated with time series data. In one aspect, a plurality of sets of time series data is received. The sets of time series data include a set of time series data corresponding to each data subject of a plurality of data subjects. The data subjects are segmented into groups according to a clustering algorithm applied to the sets of time series data. Implicit ratings for the data subjects are determined. The implicit ratings include an implicit rating determined for each data subject based on a group into which the data subject is segmented. A recommendation for a first data subject of the plurality of data subjects is generated based on the determined implicit ratings using a neural network model. The recommendation includes an actionable insight associated with the first data subject.

In a further aspect of the present disclosure, a triplet is determined for each data subject. The triplet comprises an identifier for the data subject, at least one data item, and the implicit rating determined for the data subject.

In a further aspect of the present disclosure, the first data subject is segmented into a first group. A determination that a level of similarity between the first data subject and a second data subject segmented into the first group meets a threshold condition is made. A data item that is associated with the second data subject is identified. The recommendation for the first data subject is generated based on the identified data item.

In a further aspect of the present disclosure, the neural network model is a deep recommendation model.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3 shows a flowchart of a process for generating recommendations with time series data generated implicit ratings in accordance with an embodiment.

FIG. 4 shows a flowchart of a process for determining implicit ratings for data subjects in accordance with an embodiment.

FIG. 5 shows a block diagram of an implicit rating determiner for determining implicit ratings for data subjects in accordance with an embodiment.

Figure 1:
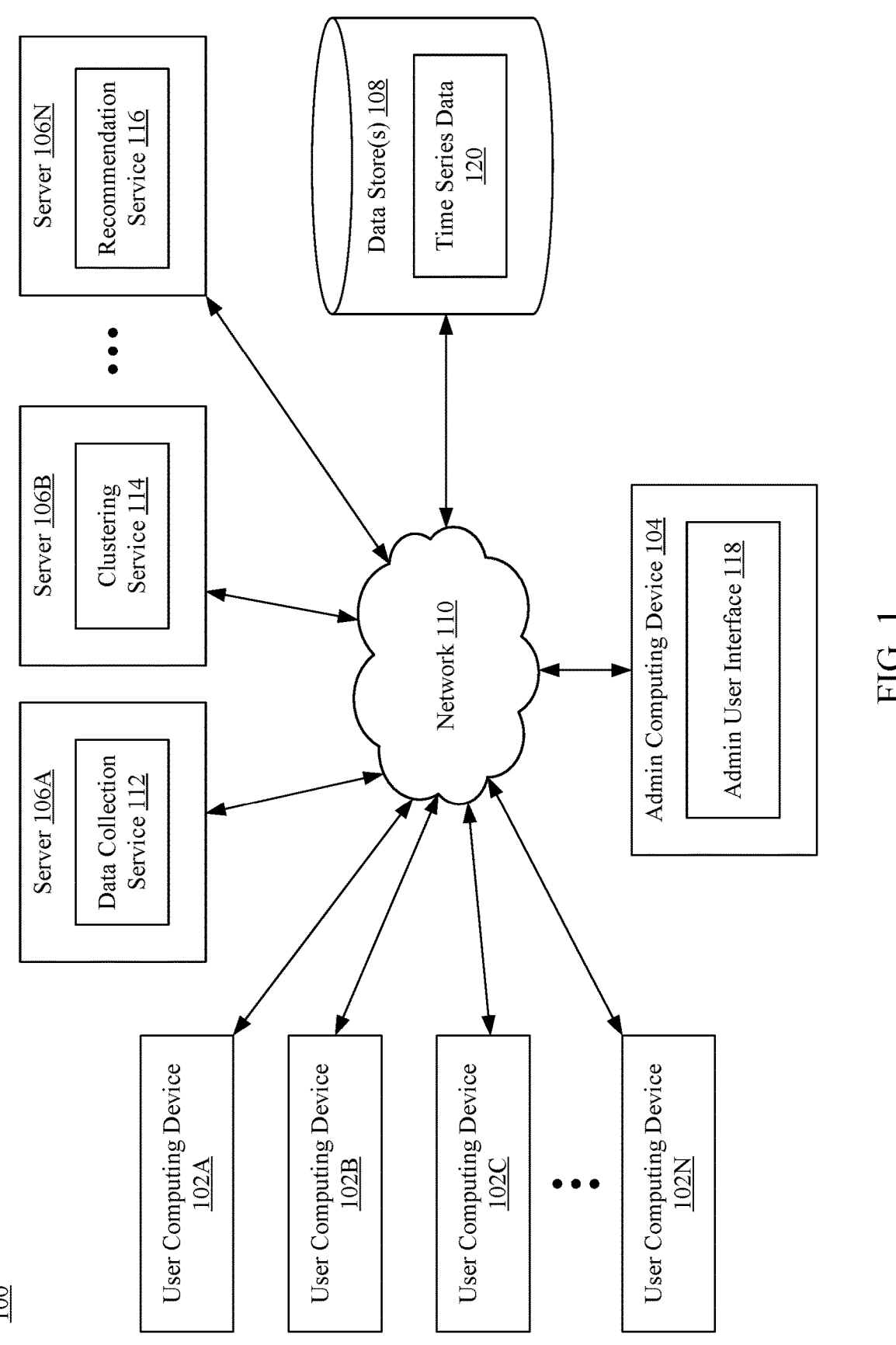
FIG. 1 shows a block diagram of a system for generating recommendations with implicit ratings generated based on time series data, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

A business is an entity (e.g., an enterprise) that buys and/or sells products, including goods and services, to generate revenue. A particular business may buy or sell products in any number of markets. Such markets may be subdivided in various ways, including geographically (e.g., regions of the world), by type of good or service (e.g., high technology, consumer goods, banking, mining, etc.). A business having proficiency in one market may desire to enter other markets. The decision to enter a new market is fraught with risk for a business due to the investment in resources (money, workers, etc.) that may be needed to make the new market entry. As such, effective techniques for assisting in the making of such a decision are desired by business owners and managers. Similarly, effective techniques for assisting in the making of decisions are desired in other fields.

For instance, the performance of a data subject may be analyzed with respect to other data subjects to make a recommendation to the data subject to improve its performance and/or identify issues with the data subject. A data subject is an entity for which performance can be monitored and evaluated with respect to similar entities. Examples of data subjects include, but are not limited to, organizations (e.g., businesses, partner organizations, vendors, customer organizations, and/or any other entity that takes an active part in a business or its performance), users (e.g., individual users, employee users, customer users, family users, etc.), hardware components (e.g., computing devices, components of computing devices, electronic components, mechanical components, vehicles, and/or any other type of hardware entity), software components (e.g., resource meters in a cloud computing service, applications, instances of an application executing on a computing device, operating systems, services, and/or any other type of software entity), and/or any other type of entity for which performance can be monitored and compared with similar entities.

Various recommendation models typically rely on rankings or ratings of subjects in order to generate recommendations for data subjects. Frequently, the performance of a data subject monitored over time is represented as time series data. Existing techniques have difficulty adapting time series data to generate recommendations for subjects.

Embodiments of the present disclosure apply a clustering algorithm to measure similarities between time series data of data subjects. The resulting clusters are used to assign an implicit rating to each data subject. Thus, a recommendation model is able to utilize the implicit ratings of data subjects to generate recommendations for the data subjects. Therefore, embodiments are enabled to measure similarities between data subjects where sets of time series data associated with the data subjects may be different in length (e.g., different timelines, different number data points, etc.) to determine ratings suitable for analyzing to generate recommendations.

For example, techniques described herein provide generate recommendations based on determined implicit ratings and using a neural network model. In one aspect of the present disclosure, a plurality of sets of time series data that includes a set of time series data corresponding to each data subject of a plurality of data subjects is received. The data subjects are segmented into groups according to a clustering algorithm applied to the sets of time series data. Implicit ratings for the data subjects are determined. The implicit ratings include an implicit rating determined for each data subject based on a group into which the data subject is segmented. A recommendation for a first data subject of the plurality of data subjects is generated using a neural network model based on the determined implicit ratings. The recommendation includes an actionable insight associated with the first data subject.

Actionable insights indicate actions that can be taken to mitigate issues and/or make improvements to increase performance of a data subject. For example, an actionable insight may indicate a change or modification to be made with respect to a data subject in order to improve performance, such as a new market for a business to enter. Depending on the implementation, embodiments of the present disclosure may (e.g., automatically or semi-automatically) perform an action based on the actionable insight. Alternatively, embodiments of the present disclosure may present the actionable insights in a user interface of a computing device for further analysis, action, and/or consideration.

As such, methods, systems, and computer program products are provided for enabling generation of recommendations for a data subject based on implicit ratings determined from time series data. Embodiments described herein may better identify potential areas to improve performance (e.g., identify potential business investment opportunities, identify potential computing device performance improvement opportunities, etc.). Furthermore, embodiments apply a clustering algorithms to time series data in a manner that measures similarity between multiple data subjects to generate an implicit rating for a recommendation model. Moreover, embodiments may enable comparison of many data subjects with a broad range of features in order to generate recommendations for a data subject.

Embodiments of the present disclosure are able to leverage large amounts of data. As described herein, time series data from many data subjects across a broad range may be measured over time. In a non-limiting example, partner organizations of a cloud service provider that conduct business in several regions and industries have their revenue monitored over time to generate corresponding sets of time series data. Embodiments described herein may be used to segment these partner organizations into groups, determine implicit ratings, and generate recommendations for the partner organizations using a recommendation model.

Embodiments may be configured in various ways in various embodiments. For instance, FIG. 1 shows a block diagram of a system 100 for generating recommendations with time series data generated implicit ratings in accordance with an example embodiment. As shown in FIG. 1, system 100 includes a plurality of user computing devices 102A-102N, an admin computing device 104, a plurality of servers 106A-106N, and one or more data stores 108 ("data store 108" hereinafter). Server 106A includes a data collection service 112, server 106B includes a clustering service 114, and server 106N includes a recommendation service 116. In embodiments, user computing devices 102A-102N, admin computing device 104, servers 106A-106N, and data store 108 are communicatively coupled via a network 110 comprising one or more of local area networks (LANs), wide area networks (WANs), enterprise networks, the Internet, etc., and including one or more of wired and/or wireless portions. In accordance with an embodiment, system 100 and its components and/or subcomponents are implemented in a cloud service platform. System 100 and its components and/or subcomponents are described in further detail as follows.

Data store 108 maintains data accessible to one or more components of system 100. Examples of data store 108 include, but are not limited to, a database, a file repository, and/or any other type of storage suitable for storing data described herein. Examples of data maintained by data store 108 include, but are not limited to, user information, organization information, industry information, device information, time series data (e.g., of revenue, performance, changes in characteristics, etc.), database objects (e.g., tables (e.g., a table mapping deployment configurations to user identities), directories (e.g., that include user identifying information), etc.), structured data, unstructured data, semi-structured data, data files, etc. As shown in FIG. 1, data store 108 stores time series data 120, as discussed further below.

User computing devices 102A-102N include any computing devices of end users (e.g., individual users, customer users, partner users, organization users, employee users, family users, etc.) and admin computing device 104 include any computing device of an admin user (e.g., a service team user, a developer user, an account management user, a customer relation user, cloud provider user, etc.). User computing devices 102A-102N and/or admin computing device 104 may access network-accessible resources such as servers 106A-106N over network 110. System 100 may include fewer or greater admin computing devices and/or user computing devices than depicted in FIG. 1. User computing devices 102A-102N and admin computing device 104 ("computing devices 102-104", collectively) may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing devices 102-104 store data and execute computer programs, applications, and/or services.

For example, user computing devices 102A-102N may include various services (not shown in FIG. 1) that enable the use of and/or interaction with network-accessible resources. For example, as will be discussed further below, each of user computing devices 102A-102N may utilize a service to (e.g., periodically) report or otherwise provide various information to data collection service 112.

As also shown in FIG. 1, admin computing device 104 includes an admin user interface 118 that enables an admin user to perform administrative operations with respect to user and/or organization identities (e.g., users and/or organizations associated with user computing devices 102A-102N). Example administrative operations include, but are not limited to, initiating data collection operations, managing data collection operations, managing user and/or organization accounts, tuning clustering service 114 and/or recommendation service 116, reviewing and/or modifying recommendations, and/or any other operations that may be performed with respect to system 100 and/or users and/or organizations associated with system 100. For instance, an admin user in accordance with an embodiment interacts with admin computing device 104 via admin user interface 118 to review and transmit recommendations generated by recommendation service 116 to user computing devices 102A-102N.

Servers 106A-106N and any additional resources define a network accessible server infrastructure. In example embodiments, servers 106A-106N from a network-accessible server set, such as a cloud computing server network. For example, servers 102A-102N in accordance with an embodiment comprise a group or collection of servers (e.g., computing devices) that are each accessible by a network such as the Internet to store, manage, and process data. System 100 may include any number of servers, fewer or greater than the number of servers 106A-106N shown in FIG. 1. Each of servers 106A-106N are configured to execute one or more services (including microservices), applications, and/or supporting services. A "supporting service" is a cloud computing service/application that manages a set of servers (e.g., a cluster of servers) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be coded in any programming language. Each of servers 106A-106N may be configured to execute any number of services and/or other resources. For example, data collection service 112, clustering service 114, and recommendation service 116 in accordance with an embodiment are implemented as services executed by respective servers 106A, 106B, and 106N. In accordance with another embodiment, data collection service 112, clustering service 114, and/or recommendation service 116 are implemented by the same server. For instance, clustering service 114 and recommendation service 116 may be implemented by the same server of a recommendation system. Moreover, data collection service 112, clustering service 114, and/or recommendation service 116 may be implemented as a single service.

Data collection service 112 is a service that collects data from or about user computing devices 102A-102N and prepares the data for use by clustering service 114 and/or recommendation service 116. In accordance with an embodiment, data collection service 112 retrieves data from a database (e.g., of data store 108). In another embodiment, data collection service 112 includes a monitoring system that collects data by monitoring user computing devices 102A-102N. In embodiments, data collection service 112 generates time series data 120 from the retrieved and/or monitored data and stores time series data 120 in data store 108.

As shown in FIG. 1, system 100 comprises a single data collection service 112. However, it is also contemplated that multiple data collection services may be used. For example, in accordance with an embodiment, a separate data collection service collects data with respect to each organization and/or user associated with user computing devices 102A-102N. In accordance with another embodiment, a separate data collection service collects data with respect to a subgroup of the organizations and/or users associated with system 100. For instance, a data collection service may collect data with a subgroup of organizations and/or users based on a region the organization and/or user is associated with, a location of the computing device, an industry the organization and/or user is associated with, a service(s) the organization and/or user utilizes, a type of computing device, and/or the like. Furthermore, time series data 120 may represent the entirety of time series data generated by the respective data collection services. Alternatively, time series data 120 may include separate sets of time series data, wherein each set of time series data corresponds to an organization, a user, a computing device, a region, an industry, and/or a particular data collection service associated therewith.

Clustering service 114 is a service that segments data subjects into groups by applying a clustering algorithm (e.g., a dynamic time warping algorithm, a shapelet-based time series clustering algorithm, time series embedding clustering algorithm, spectral clustering algorithm, and/or another clustering algorithm suitable for applying to time series data to segment data subjects into groups) to time series data 120 and determining implicit ratings for the data subjects based on the groups the data subjects are segmented into. Example data subjects with respect to FIG. 1 include, but are not limited to, organization entities, users, hardware entities, and/or software entities associated with user computing devices 102A-102N. For instance, each data subject in accordance with a non-limiting example embodiment corresponds to a partner organization of a cloud computing service provider associated with system 100. Additional details regarding the segmentation of groups and determination of implicit ratings are discussed with respect to FIGS. 2-5, as well as elsewhere herein.

Recommendation service 116 is a service that generates recommendations for data subjects based on determined implicit ratings. In accordance with an embodiment, recommendation service 116 generates a recommendation for a data subject using a neural network model. In embodiments, a recommendation for a data subject includes an actionable insight associated with the data subject. For example, a recommendation to an organization entity data subject may include a recommendation to invest in an industry (e.g., an industry the organization is not already invested in), a recommendation to increase investment in an industry the organization is already invested in, a recommendation to provide goods or services to a region (e.g., by providing goods or services to a new region, or by increasing goods or services provided to an existing region), and/or the like. A recommendation to a tenant of a cloud computing platform (e.g., an individual tenant or an organization tenant) may include a recommendation to subscribe to a service, a recommendation to increase (or decrease) a number of resources to which the tenant is subscribed to, and/or the like. Additional details regarding the generation of recommendations for data subjects are described with respect to FIGS. 2, 3, and 6-9, as well as elsewhere herein.

Figure 2:
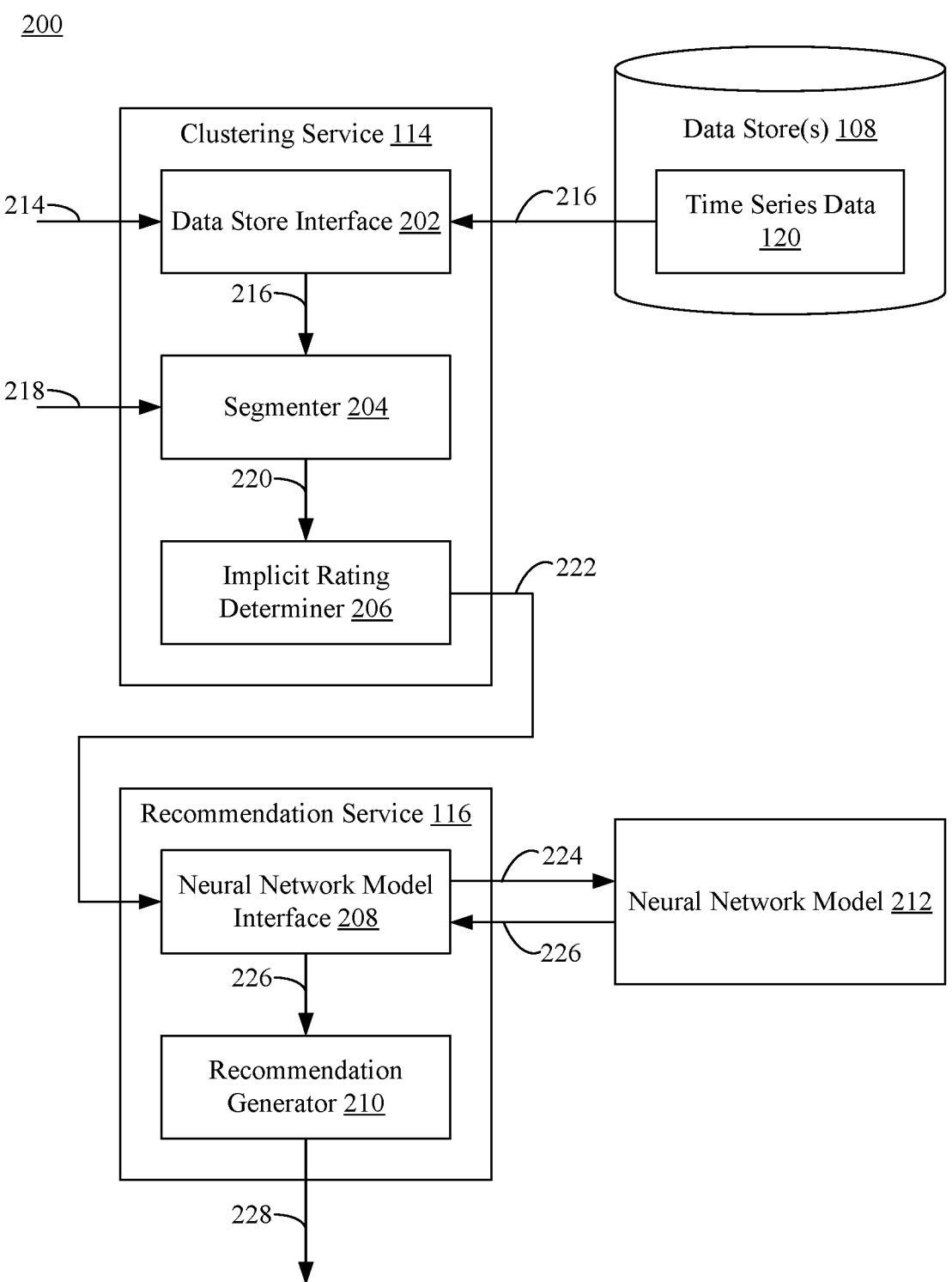
FIG. 2 shows a block diagram of a recommendation system for generating recommendations with time series data generated implicit ratings in accordance with an example embodiment.

As discussed above, techniques described herein may segment data subjects into groups, determine implicit ratings for data subjects, and generate recommendations for data subjects in various ways, in embodiments. For example, FIG. 2 shows a block diagram of a recommendation system 200 for generating recommendations with time series data generated implicit ratings in accordance with an example embodiment. As shown in FIG. 2, recommendation system 200 includes data store 108, clustering service 114, and recommendation service 116, as described above with respect to FIG. 1, and a neural network model 212. In accordance with an embodiment, neural network model 212 is a deep recommender neural network model. In FIG. 2, neural network model 212 is shown as external to recommendation service 116; however, in an alternative embodiment, neural network model 212 is a subcomponent (e.g., a sub-service) of recommendation service 116. In another alternative embodiment, neural network model 212 is a neural network model 212 external to recommendation service 200. As also shown in FIG. 2, clustering service 114 includes a data store interface 202, a segmenter 204, and an implicit rating determiner 206, and recommendation service 116 includes a neural network model interface 208 and recommendation generator 210.

For illustrative purposes, recommendation system 200 is described with respect to FIG. 3. FIG. 3 shows a flowchart 300 of a process for generating recommendations with time series data generated implicit ratings in accordance with an embodiment. Recommendation system 200 of FIG. 2 may operate according to flowchart 300 in embodiments. Not all steps of flowchart 300 need be performed in all embodiments. Further structural and operational embodiments will be apparent to persons skilled in the relevant art(s) based on the following descriptions of FIGS. 2 and 3.

In accordance with one or more embodiments, prior to the steps of flowchart 300, an admin of admin computing device 104 of FIG. 1 or a user of one of user computing devices 102A-102N transmits a request query 214. For instance, an admin of admin computing device 104 interacts with admin user interface 118 to generate and transmit request query 214. Request query 214 is a request to generate recommendations with respect to one or more data subjects. Request query 214 may include identifiers of the data subjects, indicate a group of data subjects to analyze, indicate that all data subjects are to be analyzed, and/or otherwise indicate which data subjects recommendation system 200 is to generate a recommendation with respect thereto. As shown in FIG. 2, data store interface 202 receives request query 214 and flowchart 300 begins at step 302.

Flowchart 300 begins with step 302. In step 302, a plurality of sets of time series data are received. The plurality of sets of time series data includes a set of time series data corresponding to each data subject of a plurality of data subjects. For example, data store interface 202 of FIG. 2 receives a plurality of sets of time series data 216 ("sets of time series data 216") from time series data 120 stored in data stores 108. Data store interface 202 may receive sets of time series data 216 in various ways. For instance, in accordance with an embodiment, data store interface 202 queries data store 108 for sets of time series data 216 (e.g., stored as time series data 120) by transmitting a query to data store 108 (not shown in FIG. 2). In this context, the query may include one or more identifiers corresponding to data subjects that recommendation system 200 is to evaluate (e.g., identifiers included in request query 214). Alternatively, data store interface 202 may receive sets of time series data 216 on a periodic basis, in response to time series data 120 being updated, in response to request query 214, or (e.g., directly) from data collector service 112. As shown in FIG. 2, data store interface 202 transmits sets of time series data 216 to segmenter 204.

As discussed above, sets of time series data 216 may be received by data store interface 202 in various ways. For instance, in accordance with a non-limiting running example, each data subject is a partner organization of a cloud service provider and each set of sets of time series data 216 corresponds to revenue for an industry a partner organization conducts business operations in. In this example, sets of time series data 216 are generated by data collection service 112 of FIG. 1 and stored in data stores 108 as time series data 120. Suppose an admin of the cloud service provider wants to generate recommendations for the partner organizations based on sets of time series data 216. In this context, the admin interacts with an admin user interface (e.g., admin user interface 118 of FIG. 1) to submit request query 214 (including the identifiers of the partner organizations) to recommendation system 200. Responsive to receiving request query 214, data store interface 202 obtains sets of time series data 216 from data store 108 and transmits sets of time series data 216 to segmenter 204.

In step 304, data subjects are segmented into groups according to a clustering algorithm applied to the sets of time series data. For instance, segmenter 204 of FIG. 2 segments data subjects of sets of time series data 216 into groups 220 according to a clustering algorithm. For instance, segmenter 204 applies a clustering algorithm to measure similarities between temporal sequences. As noted elsewhere herein, by applying a clustering algorithm, segmenter 204 is able to measure similarities between sets of time series data with different lengths.

Segmenter 204 may segment data subjects of sets of time series data 216 into any number of groups. For instance, referring again to the non-limiting running example described above with respect to step 302, segmenter 204 segments data subjects (partner organizations) into an "increasing" group or a "decreasing" group, where the increasing group corresponds to a growth in revenue over time and the decreasing group corresponds to a decrease in revenue over time. Segmenter 204 segments data subjects into one of the two groups by applying a clustering algorithm to each of sets of time series data 216. Depending on the implementation, segmenter 204 may segment the data subject as a whole, or (e.g., only) a subset of the data subject that conducts business in a particular industry.

In some embodiments, the clustering algorithm used by segmenter 204 may be tuned (e.g., automatically, based on a user, or based on a machine learning model). For instance, as shown in FIG. 2, segmenter 204 receives a tuning input 218. Tuning input 218 adjusts parameters of the clustering algorithm segmenter 204 applies to time series data 216. For instance, tuning input 218 may adjust the number of K clusters (e.g., the number of groups 216 that data subjects are segmented into), initialize cluster centroids, randomize cluster centroids, set the window size, set the norms, and/or otherwise tune, modify, initialize, and/or adjust parameters of the clustering algorithm. In accordance with an embodiment, an admin user interacts with an admin user interface (e.g., admin user interface 118 of FIG. 1) to generate tuning input 218 and transmit it to segmenter 204. Alternatively, tuning input 218 is automatically generated by recommendation system 200 (or an external monitoring system not shown in FIG. 2) based on the performance of recommendation system 200 or a component thereof over time.

In some embodiments, segmenter 204 includes a machine learning algorithm. For instance, segmenter 204 may apply the clustering algorithm to time series data 216 and cluster the data subjects into groups 220 using a machine learning algorithm. The machine learning algorithm in accordance with an embodiment uses an unsupervised learning method. In accordance with an alternative embodiment, segmenter 204 queries an external machine learning model (not shown in FIG. 2) that uses such a machine learning algorithm to segment the data subjects into groups 220.

In step 306, implicit ratings are determined for the data subjects. The implicit ratings include an implicit rating determined for each data subject based on a group into which the data subject is segmented. For example, implicit rating determiner 206 of FIG. 2 determines implicit ratings for data subjects based (e.g., at least) on groups 220. Additional details regarding determining implicit ratings are discussed with respect to FIGS. 4 and 5, as well as elsewhere herein. As shown in FIG. 2, implicit rating determiner 206 transmits the determined implicit ratings to recommendation service 116 as implicit rating information 222. Implicit rating information 222 includes the determined implicit ratings and may further include identifiers of data subjects, data items (e.g., regional information, industry information, service information, device information, etc.), and/or any other information associated with time series data 216, request query 214, the data subjects, and/or the like.

Implicit ratings may be determined in various ways, in embodiments. For instance, implicit rating determiner 206 may determine implicit ratings for a data subject based on the group the data subject is segmented into, the group(s) that data subjects that are similar to the data subject are segmented into, features of the data subject, and/or any other information associated with the data subject and/or the group to which it is segmented.

For example, referring to the running example described above with respect to steps 302 and 304, implicit rating determiner 206 determines implicit ratings from groups 220 (e.g., the "increasing" group and the "decreasing" group). In this example, suppose the partner organizations conduct business in eight industries (Industry 1, Industry 2, Industry 3, Industry 4, Industry 5, Industry 6, Industry 7, and Industry 8). Furthermore, suppose a majority of partner organizations that conduct business in Industries 1-4 are segmented into the "increasing" group and a majority of partner organizations that conduct business in Industries 5-8 are segmented into the "decreasing" group. In this context, implicit rating determiner 206 determines, for each partner organization, an implicit rating for the partner organization based on the group the partner organization is segmented into and the group that the majority of partner organizations in the industry that partner organization conducts business in are segmented into. For instance, a partner organization that conducts business in Industry 1 and is segmented into the "increasing" group has a higher implicit rating than a partner organization that conducts business in Industry 1 and is segmented into the "decreasing" group. Furthermore, the implicit ratings may be based on the revenue of the organizations, growth in revenue over time of the organizations, size of the organizations, or other factors.

As discussed above, implicit rating determiner 206 may consider considers features of a data subject or related data subjects when determining the implicit rating for the data subject. The impact of a feature on the determination made by implicit rating determiner 206 may be adjusted by applying a weight to the feature. For instance, with reference to the running example, a first partner organization with a larger percentage of a market share in an industry is given more weight than a second partner organization with a smaller percentage of a market share in the industry in determining whether or not the industry is considered to be increasing or decreasing in growth.

In step 308, a recommendation for a first data subject of the plurality of data subjects is generated, using a neural network model, based on the determined implicit ratings. The recommendation includes an actionable insight associated with the first data subject. For example, recommendation service 116 of FIG. 2 generates one or more recommendations 228 ("recommendations 228" hereinafter) using neural network model 212 based on implicit ratings included in implicit rating information 222. As shown in FIG. 2, neural network model interface 208 receives implicit rating information 222 from implicit rating determiner 206. Responsive to receiving implicit rating information 222, neural network model interface 208 transmits a model query 224 to neural network model 212. Model query 224 includes the implicit ratings (or a subset of the implicit ratings) and optionally other information included in implicit rating information 222. For instance, as discuss further with respect to FIGS. 4 and 5 and elsewhere herein, model query 224 includes triplets for each data subject comprising an identifier for the data subject, a data item, and the implicit rating determined for the data subject.

Neural network model 212 receives model query 224 and generates a model response 226. In embodiments, model response 226 includes associations of data subjects and data items. For example, model response 226 may include associations of data subjects with data items. In accordance with an embodiment, and as discussed further with respect to FIG. 9, model response 226 includes ranking information with respect to data subjects and associated data items. Neural network model interface 208 receives model response 226 from neural network model 212 and transmits the response to recommendation generator 210.

Recommendation generator 210 generates recommendations 228 based on model response 226. Depending on the implementation, recommendations 228 may include recommendations for a single data subject of the data subjects or multiple (e.g., all or a subset of) data subjects. For instance, recommendation generator 210 may generate recommendations 228 for a data subject associated with user computing device 102A of FIG. 1 and transmit recommendations 228 to user computing device 102A. Alternatively, recommendation generator 210 generates recommendations 228 for data subjects associated with user computing devices 102A-102N. In this context, recommendation generator 210 may transmit each recommendation of recommendations 228 to the corresponding user computing device or to admin computing device 104 for further analysis and/or distribution.

Referring to the running example described above with respect to steps 302-306, neural network model interface 208 receives implicit rating information 222 and transmits model query 224 to neural network model 212. Neural network model 212 receives model query 224 and generates model response 226. In this example, suppose model query 224 is a query for recommendations for partner organizations in the "increasing" group that conduct business in an "increasing" industry. Neural network model interface 208 receives model response 226 and transmits the response to recommendation generator 210. Model response 226 includes associations of the partner organizations and data items. Recommendation generator 210 receives model response 226 and generates recommendations 228 for each of the partner organizations included in model query 224. In this example, suppose recommendations 228 includes a (e.g., top) recommendation for each of the partner organizations. Recommendation generator 210 transmits recommendations 228 to admin computing device 104 of FIG. 1. Text or graphic versions of recommendations 228 are displayed via admin user interface 118.

As discussed above, implicit rating determiner 206 of FIG. 2 may determine implicit ratings for data subjects in various ways, in embodiments. For example, FIG. 4 shows a flowchart 400 of a process for determining implicit ratings for data subjects in accordance with an embodiment. Implicit rating determiner 206 of FIG. 2 may operate according to flowchart 400, in embodiments. Flowchart 400 is a further embodiment of step 306 of flowchart 300, as described with respect to FIG. 3. For purposes of illustration, flowchart 400 is described with respect to FIG. 5. FIG. 5 shows a block diagram of implicit rating determiner 206 of FIG. 2 for determining implicit ratings for data subjects in accordance with an embodiment. As shown in FIG. 5, implicit rating determiner 206 includes a data subject information analyzer 502, a segment analyzer 504, and a triplet determiner 506. Flowchart 400 of FIG. 4 and implicit rating determiner 206 of FIG. 5 are described as follows. Note that steps of flowchart 400 may be performed in an order different than shown in FIG. 4 in some embodiments. Furthermore, not all steps of flowchart 400 need be performed in all embodiments. Further structural and operational embodiments will be apparent to persons skilled in the relevant art(s) based on the following description.

Flowchart 400 begins with step 402. In step 402, sets of time series data are analyzed to determine one or more data items associated with data subjects. For instance, data subject information analyzer 502 of FIG. 5 analyzes sets of time series data 216 to determine one or more data items associated with the data subjects corresponding to sets of time series data 216. Data subject information analyzer 502 may analyze any information of sets of time series data 216 or otherwise corresponding to sets of time series data 216 to determine the data items. For instance, data subject information analyzer 502 may analyze column data of time series data 216, metadata of time series data 216, external data based on identifier(s) of data subject(s) corresponding to sets of time series data 216, and/or the like to determine data items associated with the data subjects. As shown in FIG. 5, data subject information analyzer 502 transmits the data items to triplet determiner 506 as data item information 508. Data item information 508 includes the determined data items and optionally identifiers for data subjects, associations between the determined data items and identifiers, and/or any other information associated with the determined data items and/or data subjects. For example, data item information 508 may include a table that associates identifiers of data subjects with corresponding determined data items.

Referring to the non-limiting running example described with respect to FIGS. 2 and 3, data subject information analyzer 502 analyzes sets of time series data 216 corresponding to the partner organizations. Data subject information analyzer 502 identifies identifiers of the partner organizations in time series data 216. Data subject information analyzer 502 accesses partner organization data stored in memory (not shown in FIG. 5) to determine additional information corresponding to the identifiers of the partner organizations. By doing so, data subject information analyzer 502 determines industries the partner organizations conduct business in, services the partner organizations are subscribed to, market share information of the partner organizations, and which regions the partner organizations conduct business in. Data subject information analyzer 502 collects the determined additional information as data items and associates the data items with identifiers of corresponding partner organizations in a table. Data subject information analyzer 502 transmits the table as data item information 508 to triplet determiner 506.

In step 404, groups are analyzed to determine implicit ratings for the data subjects. For instance, segment analyzer 504 analyzes groups 220 to determine implicit ratings 510 for the data subjects. Segment analyzer 504 determines implicit ratings 510 by applying a clustering algorithm to groups 220, as described elsewhere herein. In some embodiments, segment analyzer 504 obtains additional information associated with data subjects and/or groups 220 and uses the additional information in determining implicit ratings 510. For instance, segment analyzer 504 may obtain additional information for data subjects stored in memory (e.g., in a similar manner as data subject information analyzer 502). As shown in FIG. 5, segment analyzer 504 transmits implicit ratings 510 to triplet determiner 506. In accordance with an embodiment, segment analyzer 504 includes identifiers of the data subjects associated with implicit ratings 510 in the transmission.

While step 404 is illustrated as subsequent to step 402 in FIG. 4, it is also contemplated herein that steps 402 and 404 may be performed in reverse order, simultaneously, with an overlap in time performed, and/or otherwise performed in an order different than shown in FIG. 4, in some embodiments.

In step 406, a triplet for each data subject is determined. The triplet comprises an identifier for the data subject, a data item, and the implicit rating determined for the data subject.

For instance, triplet determiner 506 determines triplets for each data subject based on data item information 508 and implicit ratings 510. Triplet determiner 506 may determine the triplets by matching identifiers of data subjects in data item information 508 with identifiers associated with implicit ratings 510. In this context, each triplet includes the identifier for the data subject, data items determined by data subject information analyzer 502 that are associated with the data subject, and an implicit rating for the data subject determined by segment analyzer. As shown in FIG. 5, triplet determiner 506 transmits the triplets to neural network model interface 208 of FIG. 2 as implicit rating information 222.

Referring to the running example described above with respect to FIG. 2, FIG. 3, and step 402, triplet determiner 506 determines triplets for each partner organization based on data item information 508 and implicit ratings 510. In this context, the triplet includes an identifier for the partner organization, data items associated with the partner organization (e.g., industries the partner organization conducts business in, services the partner organization is subscribed to, market share information of the partner organization, and which regions the partner organization conducts business in), and the implicit rating for the partner organization. Triplet determiner 506 transmits the determined triplets to neural network model interface 208 of FIG. 2 as implicit rating information 222.

Figure 6:
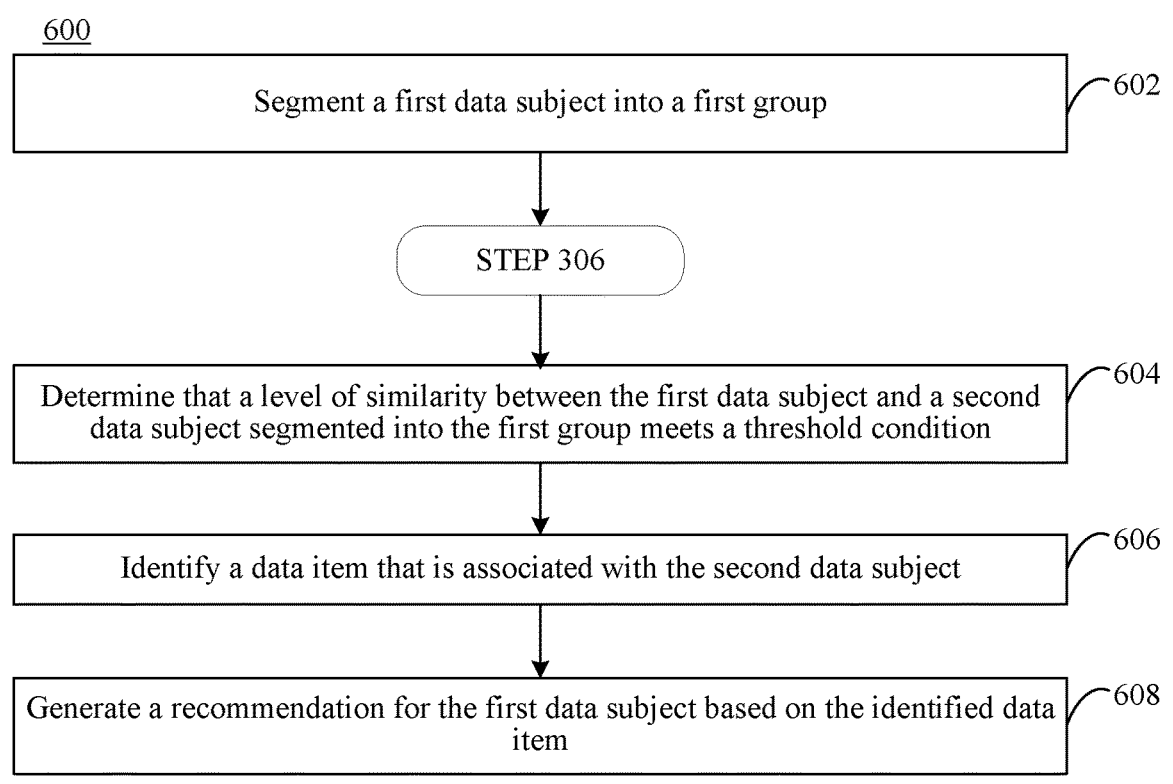
FIG. 6 shows a flowchart of a process for segmenting data subjects and generating a recommendation with time series data generated implicit ratings in accordance with an embodiment.

As described above, segmenter 204 may segment data subjects into groups and recommendation service 116 may generate recommendations for data subjects in various ways, in embodiments. For instance, FIG. 6 shows a flowchart 600 of a process for segmenting data subjects and generating a recommendation with time series data generated implicit ratings in accordance with an embodiment. Recommendation system 200 of FIG. 2 may operate according to flowchart 600, in embodiments. Flowchart 600 is a further embodiment of steps 304-308 of flowchart 300, as described with respect to FIG. 3. Note that steps of flowchart 600 may be performed in an order different than shown in FIG. 6 in some embodiments. Furthermore, not all steps of flowchart 600 need be performed in all embodiments. Further structural and operational embodiments will be apparent to persons skilled in the relevant art(s) based on the following description.

Flowchart 600 begins with step 602, which may be a further embodiment of step 304 of flowchart 300, as described with respect to FIG. 3. In step 602, a first data subject is segmented into a first group. For instance, segmenter 204 of FIG. 2 segments a first data subject into a first group, as described elsewhere herein. Referring to the non-limiting running example described above with respect to FIGS. 2-5, suppose segmenter 204 segments a first partner organization ("Organization 1") into the "increasing" group. In embodiments, segmenter 204 may repeat step 602 to segment each data subject into a corresponding group.

As shown in FIG. 6, flowchart 600 continues to step 306, as described with respect to FIG. 3. As also shown in FIG. 6, flowchart 600 subsequently continues to steps 604-608, which may be further embodiments of step 308 of flowchart 300, as described with respect to FIG. 3.

In step 604, a determination that a level of similarity between the first data subject and a second data subject segmented into the first group meets a threshold condition is made. For example, neural network model 212 of FIG. 2 determines that a level of similarity between the first data subject and a second data subject segmented into the first group meets a threshold condition. Referring again to the non-limiting running example described above with respect to step 602, neural network model 212 receives model query 224 that corresponds to a request to generate a recommendation for Organization 1. Responsive to receiving model query 224, neural network model 212 determines that a level of similarity between Organization 1 and a second partner organization ("Organization 2") segmented into the "increasing" group meets a threshold condition.

Neural network model 212 may determine levels of similarity between data subjects in various ways, in embodiments. For instance, neural network model 212 may determine a data item (e.g., region information, industry information, service information, device information, etc.) of the first data subject matches a data item of the second data subject, determine that a predetermined number of data items of the first data subject match the data items of the second data subject, determine that implicit ratings of the first and second data subjects are within a predetermined threshold, cross correlate performances (e.g., as determined from corresponding sets of time series) of the first and second data subjects to determine the cross correlation meets a predetermined threshold, and/or otherwise determine that a level of similarity between the data subjects meets a threshold condition. The threshold condition may be a default threshold level (e.g., a number of matching data item, a percentage of matching data items, implicit rating thresholds, a minimum correlation thresholds, etc.), a threshold level set by an admin user (e.g., via interaction with admin user interface 118 of FIG. 1), and/or a threshold determined by training neural network model 212.

In step 606, a data item that is associated with the second data subject is identified. For instance, neural network model 212 identifies a data item associated with the second data subject. In accordance with an embodiment, the data item is a data item that is not associated with the first data subject. For instance, referring to the non-limiting running example described above with respect to steps 602 and 604, neural network model 212 identifies region information for a first region, "Region A," associated with Organization 2 (i.e., that indicates Organization 2 conducts business in Region A) and determines that Organization 1 does not conduct business in Region A. Alternatively, the data item is a data item that is loosely associated with the first data subject. For instance, referring to the foregoing non-limiting running example, suppose Organization 1 conducts a small amount of business in a second region, "Region B." In this context, Organization 1 is "loosely" associated with Region B. This loose association may be indicated in implicit rating information provided in the model query. Continuing the example, neural network model 212 identifies region information for Region B associated with Organization 2 (i.e., that indicates that Organization 2 conducts business in Region B). Neural network model 212 may determine that Organization 2 invests more in Region B than Organization 1, or that Organization 2 is increasing investment in Region B over time (e.g., indicating potential growth opportunities in the region).

In step 608, a recommendation for the first data subject is generated based on the identified data item. For example, neural network model 212 of FIG. 2 associates the identified data items with the first data subject and provides model response 226 to neural network model interface 208. Model response 226 includes the association between the identified data items and the first data subject. Neural network model interface 208 transmits model response 226 to recommendation generator 210. Recommendation generator 210 generates a recommendation for the first data subject based on the identified data items in model response 226.

Referring to the non-limiting running example described above with respect to steps 602-608, neural network model 212 associates the Region A and Region B data items with an identifier of Organization 1 and generates model response 226 including the association. Neural network model interface 208 transmits model response 226 to recommendation generator 210. Recommendation generator 210 generates a first recommendation for Organization 1 to invest in Region A and a second recommendation for Organization to increase investment in Region B.

In some embodiments, neural network model interface 208 and/or recommendation generator 210 generate more than one recommendation for a data subject. Furthermore, and as described further with respect to FIG. 9, neural network model 212 may determine a ranking score for recommendations for a data subject. In this manner, recommendation service 116 generates a list of recommendations for a data subject and indicates a rank in which each recommendation is made with respect to the other recommendations (e.g., which recommendation is most suitable for the data subject, which recommendation should be prioritized, which recommendation has the greatest potential impact in improving performance of the data subject, etc.).

Note that recommendation service 116 (or subcomponents/subservices thereof) and/or neural network 212 may repeat steps 604-608 of flowchart 600 for each data subject and/or pair of data subjects. For instance, neural network model 212 may determine each data subject where the level of similarity between the first data subject and that data subject meets a threshold condition. Furthermore, neural network model 212 may identify any number of data items associated with these data subjects. Neural network model 212 may determine rankings for each of the identified data items with respect to one another.

Also note that that recommendation service 116 (or subcomponents/subservices thereof) and/or neural network 212 may generate a matrix that illustrates relative levels of similarity between data subjects. In accordance with an embodiment, the matrix includes "similarity scores" that indicate the level of similarity between two data subjects. In some embodiments, similarity scores are measured on a (e.g., predetermined) set scale (e.g., 1 to 10, 0 to 100, etc.) where the maximum score indicates an identical data subject. Alternatively, similarity scores are measured with respect to other similarity scores in the matrix (e.g., two data subjects with the maximum score have the highest level of similarity to one another and the two data subjects with the minimum score have the lowest level of similarity to one another).

III. Example Embodiments of Recommendations to Data Subjects

As described herein, embodiments may be configured in various ways to generate recommendations to data subjects. A recommendation for a data subject includes an actionable insight associated with the data subject. These recommendations may be transmitted to a computing device (e.g., a user computing device of user computing devices 102A-102N and/or admin computing device 104 of FIG. 1). In embodiments, a recommendation may be displayed in a user interface of a computing device that receives the recommendation. For instance, admin computing device 104 receives recommendations for one or more data subjects from recommendation service 116. The recommendations are displayed (e.g., as images and/or text) by admin user interface 118.

Figure 7:
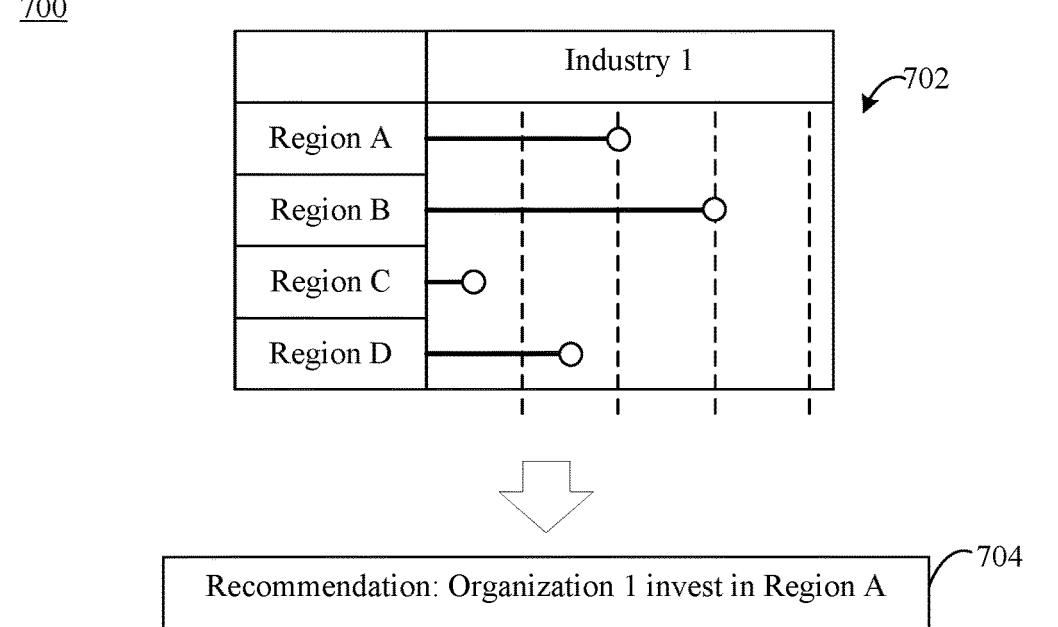
FIG. 7 shows an example process for generating a recommendation based on region and industry information, in accordance with an embodiment.

Note that recommendation systems may generate recommendations in various ways, in embodiments. For example, in an implementation where the data subjects are partner organizations of a cloud service provider, recommendation system 200 of FIG. 2 may generate recommendations based on region and industry information of the partner organizations. For instance, FIG. 7 shows an example process 700 ("process 700" herein) for generating a recommendation based on region and industry information, in accordance with an embodiment. Further structural and operational examples will be apparent to persons skilled in the relevant art(s) based on the following descriptions. Process 700 is described as follows with respect to recommendation system 200 of FIG. 2.

As shown in FIG. 7, process 700 includes an industry graph 702 and a recommendation 704. Industry graph 702 illustrates revenue of partner organizations that conduct business in a first industry, "Industry 1", in four regions, "Region A," "Region B," "Region C," and "Region D." Industry graph 702 represents data associated with data subjects analyzed and generated by recommendation system 200 of FIG. 2. For example, suppose clustering service 114 receives a request query 214 to generate recommendations for partner organizations of a cloud service provider. As described with respect to FIG. 2, clustering service 114 obtains sets of time series data 216 (e.g., time series data corresponding to revenue of the partner organizations over time) that correspond to the partner organizations, segments the partner organizations into groups according to a clustering algorithm applied to sets of time series data 216, and determines implicit ratings for the partner organizations. Recommendation service 116 receives the implicit ratings for the partner organizations and uses neural network model 212 to generate recommendations for at least one of the partner organizations.

As shown in FIG. 7, recommendation service 116 uses neural network model 212 to generate recommendation 704 based on the implicit ratings. For instance, suppose Organization 1 is a partner organization that conducts business in Industry 1 and Region B but not in Region A. As shown in industry graph 702, Region B is the region where revenue in Industry 1 is the highest; however, Region A also has a high level of revenue relative to the other regions. In this example, neural network model 212 determines that Organization 1 should invest in Region A. Neural network model 212 makes this determination based on the performance of other partner organizations that conduct business in Industry 1. Recommendation service 116 generates recommendation 704 and transmits the recommendation (e.g., to a user computing device associated with Organization 1 or to an admin computing device associated with the cloud service provider) (e.g., for display in a user interface).

Figures 8, 9:
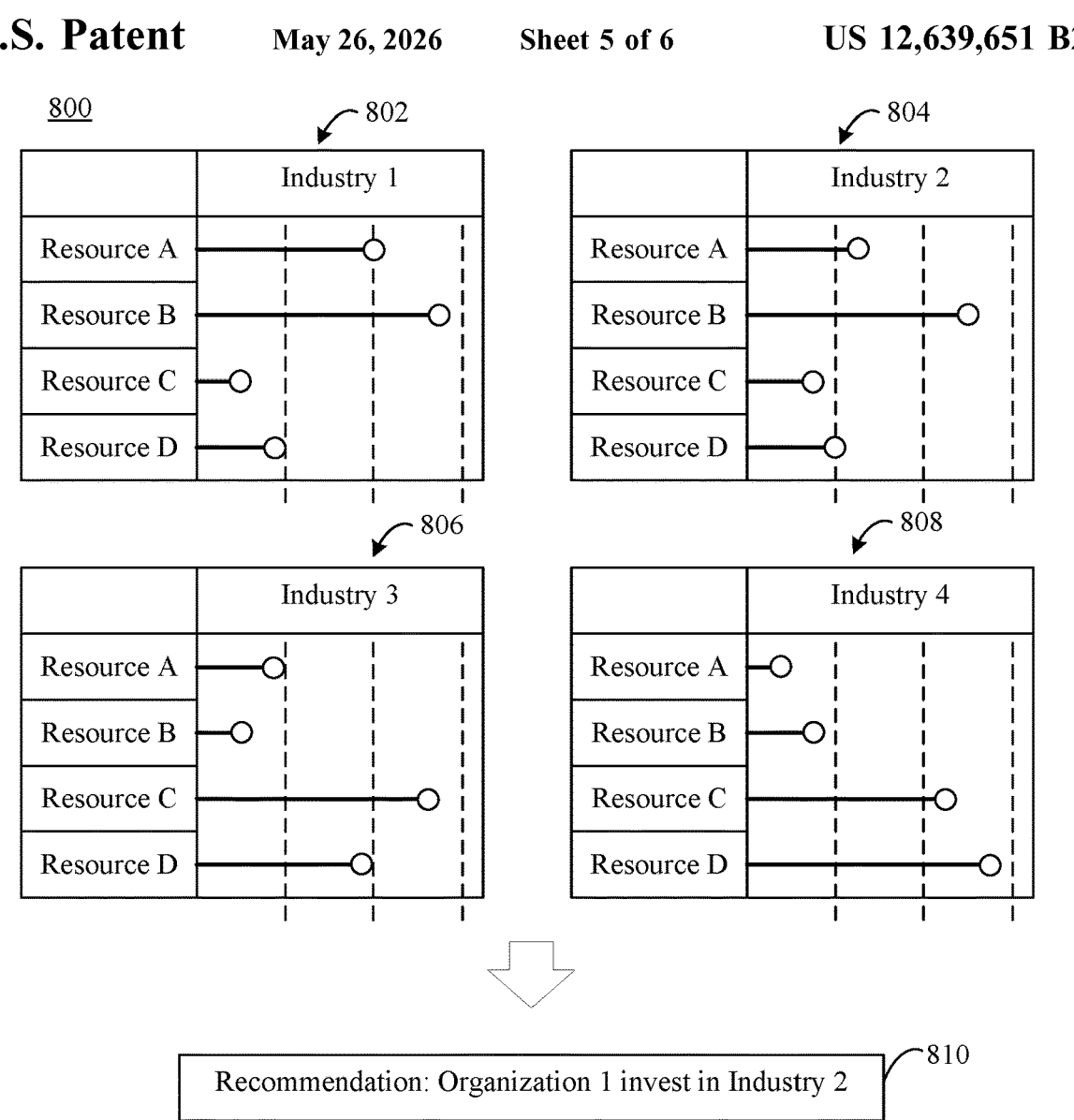
FIG. 8 shows an example process for generating a recommendation based on resource and industry information, in accordance with an embodiment.
FIG. 9 shows an example table of recommendations, in accordance with an embodiment.

As discussed above, recommendation systems may generate recommendations in various ways, in embodiments. For example, in another implementation where the data subjects are partner organizations of a cloud service provider, recommendation system 200 of FIG. 2 may generate recommendations based on resource and industry information of the partner organizations. For instance, FIG. 8 shows an example process 800 ("process 800" herein) for generating a recommendation based on resource and industry information, in accordance with an embodiment. Further structural and operational examples will be apparent to persons skilled in the relevant art(s) based on the following descriptions. Process 800 is described as follows with respect to recommendation system 200 of FIG. 2.

As shown in FIG. 8, process 800 includes a first industry graph 802 ("graph 802" herein), a second industry graph 804 ("graph 804" herein), a third industry graph 806 ("graph 806" herein), and a fourth industry graph 808 ("graph 808" herein). Graph 802 illustrates usage of resources of the cloud service provider ("Resource A," "Resource B," "Resource C," and "Resource D") by the partner organizations that conduct business in a first industry, "Industry 1." Graphs 804, 806, and 808 illustrate usage of the resources by partner organizations that conduct business in a second industry, "Industry 2," a third industry, "Industry 3," and a fourth industry, "Industry 4," respectively. Graphs 802-808 represent data associated with the partner organizations analyzed by recommendation system 200 of FIG. 2. For example, suppose clustering service 114 received a request query 214 to generate recommendations for the partner organizations. As described with respect to FIG. 2, clustering service 114 obtains sets of time series data 216 (e.g., time series data corresponding to resources used by the partner organizations over time) that correspond to the partner organizations, segments the partner organizations into groups according to a clustering algorithm applied to sets of time series data 216, and determines implicit ratings for the partner organizations. Recommendation service 116 receives the implicit ratings for the partner organizations and uses neural network model 212 to generate recommendations for at least one of the partner organizations.

As shown in FIG. 8, recommendation service 116 uses neural network model 212 to generate recommendation 810 based on the implicit ratings. For instance, suppose Organization 1 is the partner organization described above with respect to FIG. 7. Furthermore, suppose Organization does not conduct business in Industry 2. As shown in Graph 802 and 804, partner organizations in both Industry 1 and Industry 2 heavily use Resource A and Resource B. In this example, neural network model 212 determines that Organization 1 should invest in Industry 2. Neural network model 212 makes this determination based on the similarity in resources used by Organization 1, other partner organizations conducting business in Industry 1, and partner organizations conducting business in Industry 2. Recommendation service 116 generates recommendation 810 and transmits the recommendation (e.g., to a user computing device associated with Organization 1 or to an admin computing device associated with the cloud service provider) (e.g., for display in a user interface).

Several non-limiting examples of processes for generating a recommendation for a data subject have been described with respect to FIGS. 7 and 8. Note that recommendation systems may generate multiple recommendations for a data subject, in embodiments. Furthermore, recommendation systems may rank the multiple recommendations with respect to one another. For example, FIG. 9 shows an example table of recommendations 900 ("table 900" herein), in accordance with an embodiment. Further structural and operational embodiments will be apparent to persons skilled in the relevant art(s) based on the following description. Table 900 is described as follows with respect to recommendation system 200 of FIG. 2, process 700 of FIG. 7, and process 800 of FIG. 8.

As shown in FIG. 9, table 700 includes a first column labeled "Rank," a second column labeled "Item(s)," and a third column labeled "Ranking Score." The Rank column shows a ranking assigned to a recommendation, the Item(s) column shows data items of the recommendation, and the Ranking Score column shows a ranking score assigned to the recommendation. In particular, table 700 represents the top 5 recommendations generated for Organization 1 by recommendation service 116 using neural network model 212 of FIG. 2. Continuing with reference to the examples described above with respect to FIGS. 7 and 8. Organization 1 is a partner organization of a cloud service provider that conducts business in Industry 1 in Region B, and does not conduct business in Region A or Industry 2. Furthermore, suppose Organization 1 does conduct business in Region C as well.

Recommendation service 116 generates table 900 using neural network model 212, as described elsewhere herein. As shown in FIG. 9, table 900 includes a first recommendation with a rank of "1" ("Recommendation 1" herein), a second recommendation with a rank of "2" ("Recommendation 2" herein), a third recommendation with a rank of "3" ("Recommendation 3" herein), a fourth recommendation with a rank of "4" ("Recommendation 4" herein), and a fifth recommendation with a rank of "5" ("Recommendation 5" herein). Recommendation service 116 generates Recommendation 1 by using neural network model 212 to determine that other partner organizations conducting business in Industry 1 in Region A have a growth in revenue, as described with respect to FIG. 7. Recommendation 2 is generated based on neural network model 212 determining that a level of similarity of resources used by Organization 1 to conduct business in Industry 1 and resources used by partner organizations conducting business in Industry 2 meets a threshold condition, as described with respect to FIG. 8. Recommendation 3 is generated based on similar techniques as Recommendation 1.

It is also noted that network model 212 may be used to generate recommendations based on other data items associated with a data subject and similar data subjects. For instance, neural network model 212 generates Recommendation 4 by analyzing the hardware (e.g., computing devices, electronic devices, mechanical devices, machinery, and/or the like) and facilities (e.g., office buildings, factories, laboratories, store fronts, and/or the like) used by Organization 1 to conduct business in Industry 1 and Region B. Neural network model 212 determines that a level of similarity between Organization 1 and a sub-group of partner organizations meets a threshold condition. This sub-group of partner organizations include partner organizations that are in the "increasing" group, conduct business in Region B, and use similar hardware and facilities as Organization 1. Neural network model 212 identifies a data item associated with the sub-group that indicates the sub-group of partner organizations conduct business in Industry 3. In this context, recommendation service 116 generates Recommendation 4 based on the determination and the identification made by neural network model 212.

Furthermore, neural network model 212 may be used to generate recommendations that recommend multiple "data items" to a data subject. For instance, neural network model 212 generates Recommendation 5, which includes a recommendation to invest in Industry 2 (i.e., an industry that Organization 1 does not conduct business in) and in Region C (i.e., a region that Organization 1 does not conduct business in). Neural network model 212 determines that a level of similarity between Organization 1 and a sub-group of partner organizations meets a threshold condition. This sub-group of partner organizations include partner organizations that are in the "increasing" group and use similar resources of the cloud service provider as Organization 1. Neural network model 212 identifies a first data item associated with the sub-group that indicates the sub-group of partner organizations conduct business in Industry 2 and a second data item that indicates the sub-group of partner organizations conduct business in Region C. In this context, recommendation service 116 generates Recommendation 5 based on the determination and identification made by neural network model 212.

As noted elsewhere herein, in some embodiments neural network model 212 determines a ranking score for recommendations for data subjects. For instance, neural network model 212 is used to determine ranking scores of Recommendations 1-5 shown in the Ranking Score column of table 900. Neural network model 212 may determine the ranking score for a recommendation based on the level of similarity between Organization 1 and the similar partner organizations, determine the ranking score for based on a level of similarity between data items of the recommendation and data items already associated with Organization 1, and/or otherwise determine ranking scores for recommendations for Organization 1. For instance, neural network model 212 determines that Recommendation 1 has a ranking score of 4.80 based on growth potential in Industry 1 and Region A and that Organization 1 already conducts business in Industry 1. Similar analysis is done for each recommendation. Recommendations with higher ranking scores may represent, for example, higher growth potential, easier investment, lower cost to invest, similarity in operations, and/or the like when compared to other recommendations generated by recommendation service 116 using neural network model 212. In this manner, recommendation service 116 is able to use neural network model 212 to generate multiple recommendations (e.g., Recommendations 1-5) for a data subject (e.g., Organization 1) and indicate which recommendation is most suitable, is most beneficial, would have a greater impact on performance, and/or otherwise most recommended for the data subject.

IV. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code configured to be executed in one or more processors and stored in a computer readable storage medium, or being implemented as hardware logic/ electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 10:
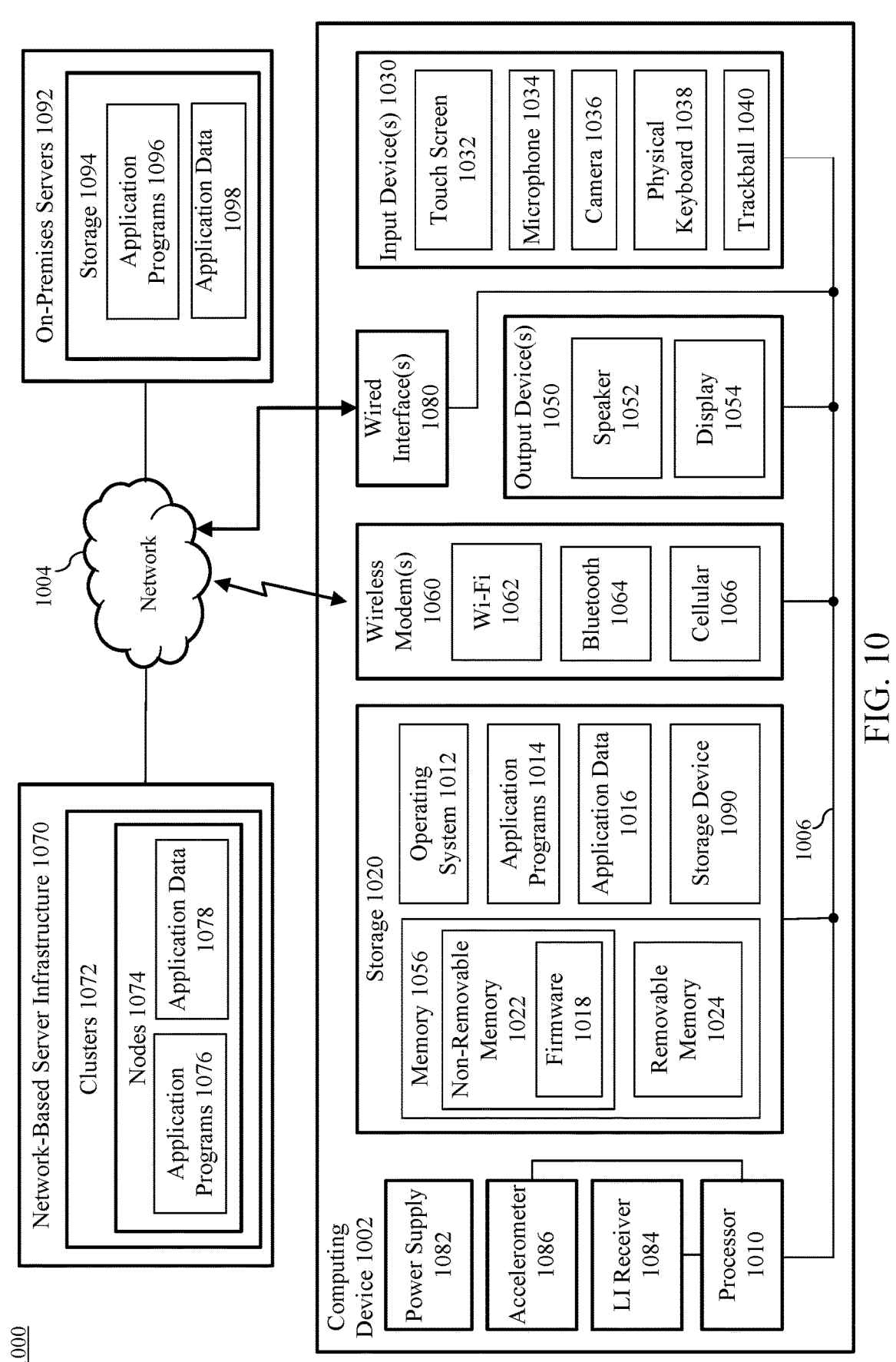
FIG. 10 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 10. FIG. 10 shows a block diagram of an exemplary computing environment 1000 that includes a computing device 1002. Computing device 1002 is an example of user computing device 102A, user computing device 102B, user computing device 102C, user computing device 102N, admin computing device 104, server 106A, server 106B, and/or server 106N as described with respect to FIG. 1, and/or recommendation system 200 as described with respect to FIG. 2, each of which may include one or more of the components of computing device 1002. In some embodiments, computing device 1002 is communicatively coupled with devices (not shown in FIG. 10) external to computing environment 1000 via network 1004. Network 1004 is an example of network 110 of FIG. 1. Network 1004 comprises one or more networks such as local area networks (LANs), wide area networks (WANs), enterprise networks, the Internet, etc., and may include one or more wired and/or wireless portions. Network 1004 may additionally or alternatively include a cellular network for cellular communications. Computing device 1002 is described in detail as follows.

Computing device 1002 can be any of a variety of types of computing devices. For example, computing device 1002 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1002 may alternatively be a stationary computing device such as a desktop computer, a personal computer (PC), a stationary server device, a minicomputer, a mainframe, a supercomputer, etc.

As shown in FIG. 10, computing device 1002 includes a variety of hardware and software components, including a processor 1010, a storage 1020, one or more input devices 1030, one or more output devices 1050, one or more wireless modems 1060, one or more wired interfaces 1080, a power supply 1082, a location information (LI) receiver 1084, and an accelerometer 1086. Storage 1020 includes memory 1056, which includes non-removable memory 1022 and removable memory 1024, and a storage device 1090. Storage 1020 also stores an operating system 1012, application programs 1014, and application data 1016. Wireless modem(s) 1060 include a Wi-Fi modem 1062, a Bluetooth modem 1064, and a cellular modem 1066. Output device(s) 1050 includes a speaker 1052 and a display 1054. Input device(s) 1030 includes a touch screen 1032, a microphone 1034, a camera 1036, a physical keyboard 1038, and a trackball 1040. Not all components of computing device 1002 shown in FIG. 10 are present in all embodiments, additional components not shown may be present, and any combination of the components may be present in a particular embodiment. These components of computing device 1002 are described as follows.

A single processor 1010 (e.g., central processing unit (CPU), microcontroller, a microprocessor, signal processor, ASIC (application specific integrated circuit), and/or other physical hardware processor circuit) or multiple processors 1010 may be present in computing device 1002 for performing such tasks as program execution, signal coding, data processing, input/output processing, power control, and/or other functions. Processor 1010 may be a single-core or multi-core processor, and each processor core may be single-threaded or multithreaded (to provide multiple threads of execution concurrently). Processor 1010 is configured to execute program code stored in a computer readable medium, such as program code of operating system 1012 and application programs 1014 stored in storage 1020. Operating system 1012 controls the allocation and usage of the components of computing device 1002 and provides support for one or more application programs 1014 (also referred to as "applications" or "apps"). Application programs 1014 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1002 can communicate with any other component according to function, although not all connections are shown for ease of illustration. For instance, as shown in FIG. 10, bus 1006 is a multiple signal line communication medium (e.g., conductive traces in silicon, metal traces along a motherboard, wires, etc.) that may be present to communicatively couple processor 1010 to various other components of computing device 1002, although in other embodiments, an alternative bus, further buses, and/or one or more individual signal lines may be present to communicatively couple components. Bus 1006 represents one or more of any of several types of bus structures, including a memory bus or memory controller, a peripheral bus, an accelerated graphics port, and a processor or local bus using any of a variety of bus architectures.

Storage 1020 is physical storage that includes one or both of memory 1056 and storage device 1090, which store operating system 1012, application programs 1014, and application data 1016 according to any distribution. Non-removable memory 1022 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1022 may include main memory and may be separate from or fabricated in a same integrated circuit as processor 1010. As shown in FIG. 10, non-removable memory 1022 stores firmware 1018, which may be present to provide low-level control of hardware. Examples of firmware 1018 include BIOS (Basic Input/Output System, such as on personal computers) and boot firmware (e.g., on smart phones). Removable memory 1024 may be inserted into a receptacle of or otherwise coupled to computing device 1002 and can be removed by a user from computing device 1002. Removable memory 1024 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1090 may be present that are internal and/or external to a housing of computing device 1002 and may or may not be removable. Examples of storage device 1090 include a hard disk drive, a SSD, a thumb drive (e.g., a USB (Universal Serial Bus) flash drive), or other physical storage device.

One or more programs may be stored in storage 1020. Such programs include operating system 1012, one or more application programs 1014, and other program modules and program data. Examples of such application programs may include, for example, computer program logic (e.g., computer program code/instructions) for implementing one or more of data collection service 112, clustering service 114, recommendation service 116, admin user interface 118, data store interface 202, segmenter 204, implicit rating determiner 206, neural network model interface 208, recommendation generator 210, neural network model 212, data subject information analyzer 502, segment analyzer 504, and/or triplet determiner 506, along with any components and/or subcomponents thereof, as well as the flowcharts/flow diagrams (e.g., flowcharts 300, 400, and/or 600) described herein, including portions thereof, as well as the processes (e.g., process 700 and/or process 800) described herein, including portions thereof, and/or further examples described herein.

Storage 1020 also stores data used and/or generated by operating system 1012 and application programs 1014 as application data 1016. Examples of application data 1016 include web pages, text, images, tables, sound files, video data, and other data, which may also be sent to and/or received from one or more network servers or other devices via one or more wired or wireless networks. Storage 1020 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1002 through one or more input devices 1030 and may receive information from computing device 1002 through one or more output devices 1050. Input device(s) 1030 may include one or more of touch screen 1032, microphone 1034, camera 1036, physical keyboard 1038 and/or trackball 1040 and output device(s) 1050 may include one or more of speaker 1052 and display 1054. Each of input device(s) 1030 and output device(s) 1050 may be integral to computing device 1002 (e.g., built into a housing of computing device 1002) or external to computing device 1002 (e.g., communicatively coupled wired or wirelessly to computing device 1002 via wired interface(s) 1080 and/or wireless modem(s) 1060). Further input devices 1030 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1054 may display information, as well as operating as touch screen 1032 by receiving user commands and/or other information (e.g., by touch, finger gestures, virtual keyboard, etc.) as a user interface. Any number of each type of input device(s) 1030 and output device(s) 1050 may be present, including multiple microphones 1034, multiple cameras 1036, multiple speakers 1052, and/or multiple displays 1054.

One or more wireless modems 1060 can be coupled to antenna(s) (not shown) of computing device 1002 and can support two-way communications between processor 1010 and devices external to computing device 1002 through network 1004, as would be understood to persons skilled in the relevant art(s). Wireless modem 1060 is shown generically and can include a cellular modem 1066 for communicating with one or more cellular networks, such as a GSM network for data and voice communications within a single cellular network, between cellular networks, or between the mobile device and a public switched telephone network (PSTN). Wireless modem 1060 may also or alternatively include other radio-based modem types, such as a Bluetooth modem 1064 (also referred to as a "Bluetooth device") and/or Wi-Fi 1062 modem (also referred to as an "wireless adaptor"). Wi-Fi modem 1062 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1064 is configured to communicate with another Bluetooth-capable device according to the Bluetooth short-range wireless technology standard(s) such as IEEE 802.15.1 and/or managed by the Bluetooth Special Interest Group (SIG).

Computing device 1002 can further include power supply 1082, LI receiver 1084, accelerometer 1086, and/or one or more wired interfaces 1080. Example wired interfaces 1080 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1080 of computing device 1002 provide for wired connections between computing device 1002 and network 1004, or between computing device 1002 and one or more devices/peripherals when such devices/peripherals are external to computing device 1002 (e.g., a pointing device, display 1054, speaker 1052, camera 1036, physical keyboard 1038, etc.). Power supply 1082 is configured to supply power to each of the components of computing device 1002 and may receive power from a battery internal to computing device 1002, and/or from a power cord plugged into a power port of computing device 1002 (e.g., a USB port, an A/C power port). LI receiver 1084 may be used for location determination of computing device 1002 and may include a satellite navigation receiver such as a Global Positioning System (GPS) receiver or may include other type of location determiner configured to determine location of computing device 1002 based on received information (e.g., using cell tower triangulation, etc.). Accelerometer 1086 may be present to determine an orientation of computing device 1002.

Note that the illustrated components of computing device 1002 are not required or all-inclusive, and fewer or greater numbers of components may be present as would be recognized by one skilled in the art. For example, computing device 1002 may also include one or more of a gyroscope, barometer, proximity sensor, ambient light sensor, digital compass, etc. Processor 1010 and memory 1056 may be co-located in a same semiconductor device package, such as being included together in an integrated circuit chip, FPGA, or system-on-chip (SOC), optionally along with further components of computing device 1002.

In embodiments, computing device 1002 is configured to implement any of the above-described features of flowcharts herein. Computer program logic for performing any of the operations, steps, and/or functions described herein may be stored in storage 1020 and executed by processor 1010.

In some embodiments, server infrastructure 1070 may be present in computing environment 1000 and may be communicatively coupled with computing device 1002 via network 1004. Server infrastructure 1070, when present, may be a network-accessible server set (e.g., a cloud-based environment or platform). As shown in FIG. 10, server infrastructure 1070 includes clusters 1072. Each of clusters 1072 may comprise a group of one or more compute nodes and/or a group of one or more storage nodes. For example, as shown in FIG. 10, cluster 1072 includes nodes 1074. Each of nodes 1074 are accessible via network 1004 (e.g., in a "cloud-based" embodiment) to build, deploy, and manage applications and services. Any of nodes 1074 may be a storage node that comprises a plurality of physical storage disks, SSDs, and/or other physical storage devices that are accessible via network 1004 and are configured to store data associated with the applications and services managed by nodes 1074. For example, as shown in FIG. 10, nodes 1074 may store application data 1078.

Each of nodes 1074 may, as a compute node, comprise one or more server computers, server systems, and/or computing devices. For instance, a node 1074 may include one or more of the components of computing device 1002 disclosed herein. Each of nodes 1074 may be configured to execute one or more software applications (or "applications") and/or services and/or manage hardware resources (e.g., processors, memory, etc.), which may be utilized by users (e.g., customers) of the network-accessible server set. For example, as shown in FIG. 10, nodes 1074 may operate application programs 1076. In an implementation, a node of nodes 1074 may operate or comprise one or more virtual machines, with each virtual machine emulating a system architecture (e.g., an operating system), in an isolated manner, upon which applications such as application programs 1076 may be executed.

In an embodiment, one or more of clusters 1072 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1072 may be a datacenter in a distributed collection of datacenters. In embodiments, exemplary computing environment 1000 comprises part of a cloud-based platform such as Amazon Web Services® of Amazon Web Services, Inc., or Google Cloud Platform™ of Google LLC, although these are only examples and are not intended to be limiting.

In an embodiment, computing device 1002 may access application programs 1076 for execution in any manner, such as by a client application and/or a browser at computing device 1002. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1002 may additionally and/or alternatively synchronize copies of application programs 1014 and/or application data 1016 to be stored at network-based server infrastructure 1070 as application programs 1076 and/or application data 1078. For instance, operating system 1012 and/or application programs 1014 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1020 at network-based server infrastructure 1070.

In some embodiments, on-premises servers 1092 may be present in computing environment 1000 and may be communicatively coupled with computing device 1002 via network 1004. On-premises servers 1092, when present, are hosted within an organization's infrastructure and, in many cases, physically onsite of a facility of that organization. On-premises servers 1092 are controlled, administered, and maintained by IT (Information Technology) personnel of the organization or an IT partner to the organization. Application data 1098 may be shared by on-premises servers 1092 between computing devices of the organization, including computing device 1002 (when part of an organization) through a local network of the organization, and/or through further networks accessible to the organization (including the Internet). Furthermore, on-premises servers 1092 may serve applications such as application programs 1096 to the computing devices of the organization, including computing device 1002. Accordingly, on-premises servers 1092 may include storage 1094 (which includes one or more physical storage devices such as storage disks and/or SSDs) for storage of application programs 1096 and application data 1098 and may include one or more processors for execution of application programs 1096. Still further, computing device 1002 may be configured to synchronize copies of application programs 1014 and/or application data 1016 for backup storage at on-premises servers 1092 as application programs 1096 and/or application data 1098.

Embodiments described herein may be implemented in one or more of computing device 1002, network-based server infrastructure 1070, and on-premises servers 1092. For example, in some embodiments, computing device 1002 may be used to implement systems, clients, or devices, or components/subcomponents thereof, disclosed elsewhere herein. In other embodiments, a combination of computing device 1002, network-based server infrastructure 1070, and/ or on-premises servers 1092 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1020. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1014) may be stored in storage 1020. Such computer programs may also be received via wired interface(s) 1080 and/or wireless modem(s) 1060 over network 1004. Such computer programs, when executed or loaded by an application, enable computing device 1002 to implement features of embodiments discussed herein.

Accordingly, such computer programs represent controllers of the computing device 1002.

Embodiments are also directed to computer program products comprising computer code or instructions stored on any computer-readable medium or computer-readable storage medium. Such computer program products include the physical storage of storage 1020 as well as further physical storage types.

V. Additional Example Embodiments

A computer-implemented method for generating recommendations is described herein. The method comprises: receiving a plurality of sets of time series data that includes a set of time series data corresponding to each data subject of a plurality of data subjects; segmenting the data subjects into groups according to a clustering algorithm applied to the sets of time series data; determining implicit ratings for the data subjects including an implicit rating determined for each data subject based on a group into which the data subject is segmented; and generating, using a neural network model, a recommendation for a first data subject of the plurality of data subjects based on the determined implicit ratings, the recommendation including an actionable insight associated with the first data subject.

In one implementation of the foregoing method, the plurality of data subjects comprises: an organization; an application; or a computing device.

In one implementation of the foregoing method, said determining implicit ratings for the data subjects comprises: determining a triplet for each data subject comprising an identifier for the data subject, a data item, and the implicit rating determined for the data subject.

In one implementation of the foregoing method, said segmenting the data subjects into groups comprises segmenting the first data subject into a first group and said generating a recommendation for a first data subject comprises: determining that a level of similarity between the first data subject and a second data subject segmented into the first group meets a threshold condition, identifying a data item that is associated with the second data subject, and generating the recommendation for the first data subject based on the identified data item.

In one implementation of the foregoing method, the data item comprises at least one of: region information; industry information; service information; or device information.

In one implementation of the foregoing method, said determining that a level of similarity between the first data subject and the second data subject meets the threshold condition comprises at least one of: determining matching region information associated with the first data subject and the second data subject; determining matching industry information associated the first data subject and the second data subject; determining the first data subject and the second data subject are subscribed to the same service; or determining the first data subject and the second data subject are associated with the same type of device hardware.

In one implementation of the foregoing method, the generated recommendation comprises at least one of: a recommendation to an organization invested in a first industry to invest in a second industry; a recommendation to an organization that provides goods or services in a first region to provide goods or services in a second region; or a recommendation to a tenant of a cloud computing platform subscribed to a first service to subscribe to a second service.

In one implementation of the foregoing method, the neural network model is a deep recommendation model.

In one implementation of the foregoing method, the clustering algorithm comprises: a dynamic time warping algorithm; a shapelet-based time series clustering algorithm; a time series embedding clustering algorithm; or a spectral clustering algorithm.

A recommendation system is described herein. The recommendation system comprises a processor circuit and a memory. The memory stores program code that is executable by the processor circuit. The program code comprises a clustering service and a recommendation service. The clustering service receives a plurality of sets of time series data that includes a set of time series data corresponding to each data subject of a plurality of data subjects. The clustering service segments the data subjects into groups according to a clustering algorithm applied to the sets of time series data. The clustering service determines implicit ratings for the data subjects including an implicit rating determined for each data subject based on a group into which the data subject is segmented. The recommendation service uses a neural network model to generate a recommendation for a first data subject of the plurality of data subjects based on the determined implicit ratings. The recommendation includes an actionable insight associated with the first data subject.

In one implementation of the foregoing recommendation system, the plurality of data subjects comprises: an organization; an application; or a computing device.

In one implementation of the foregoing recommendation system, the clustering service determines the implicit ratings for the data subjects by determining a triplet for each data subject comprising an identifier for the data subject, a data item, and the implicit rating determined for the data subject.

In one implementation of the foregoing recommendation system, the clustering service segments the data subjects into groups by segmenting the first data subject into a first group. The recommendation service generates the recommendation for the first data subject by: determining that a level of similarity between the first data subject and a second data subject segmented into the first group meets a threshold condition, identifying a data item that is associated with the second data subject, and generating the recommendation for the first data subject based on the identified data item.

In one implementation of the foregoing recommendation system, the data item comprises at least one of: region information; industry information; service information; or device information.

In one implementation of the foregoing recommendation system, the recommendation service determines that the level of similarity between the first data subject and the second data subject meets the threshold condition based on at least one of: a determination that region information associated with the first data subject matches region information associated with the second data subject; a determination that industry information associated the first data subject matches industry information associated with the second data subject; a determination that the first data subject and the second data subject are subscribed to the same service; or a determination that the first data subject and the second data subject are associated with the same type of device hardware.

In one implementation of the foregoing recommendation system, the generated recommendation comprises at least one of: a recommendation to an organization invested in a first industry to invest in a second industry; a recommendation to an organization that provides goods or services in a first region to provide goods or services in a second region;

or a recommendation to a tenant of a cloud computing platform subscribed to a first service to subscribe to a second service.

In one implementation of the foregoing recommendation system, the neural network model is a deep recommendation model.

In one implementation of the foregoing recommendation system, the clustering algorithm comprises: a dynamic time warping algorithm; a shapelet-based time series clustering algorithm; a time series embedding clustering algorithm; or a spectral clustering algorithm.

A computer-readable storage medium having computer program logic recorded thereon is described herein. When executed by a processor circuit, the program logic causes the processor circuit to perform a method comprising: receiving a plurality of sets of time series data that includes a set of time series data corresponding to each data subject of a plurality of data subjects; segmenting the data subjects into groups according to a clustering algorithm applied to the sets of time series data; determining implicit ratings for the data subjects including an implicit rating determined for each data subject based on a group into which the data subject is segmented; and generating, using a neural network model, a recommendation for a first data subject of the plurality of data subjects based on the determined implicit ratings, the recommendation including an actionable insight associated with the first data subject.

In one implementation of the foregoing computer-readable storage medium, the plurality of data subjects comprises: an organization; an application; or a computing device.

In one implementation of the foregoing computer-readable storage medium, said segmenting the data subjects into groups comprises segmenting the first data subject into a first group; and said generating a recommendation for a first data subject comprises: determining that a level of similarity between the first data subject and a second data subject segmented into the first group meets a threshold condition, identifying a data item that is associated with the second data subject, and generating the recommendation for the first data subject based on the identified data item.

In one implementation of the foregoing computer-readable storage medium, said determining that a level of similarity between the first data subject and the second data subject meets the threshold condition comprises at least one of: determining matching region information associated with the first data subject and the second data subject; determining matching industry information associated the first data subject and the second data subject; determining the first data subject and the second data subject are subscribed to the same service; or determining the first data subject and the second data subject are associated with the same type of device hardware.

In one implementation of the foregoing computer-readable storage medium, said determining implicit ratings for the data subjects comprises: determining a triplet for each data subject comprising an identifier for the data subject, a data item, and the implicit rating determined for the data subject.

In one implementation of the foregoing computer-readable storage medium, the data item comprises at least one of: region information; industry information; service information; or device information.

In one implementation of the foregoing computer-readable storage medium, the generated recommendation comprises at least one of: a recommendation to an organization invested in a first industry to invest in a second industry; a recommendation to an organization that provides goods or services in a first region to provide goods or services in a second region; or a recommendation to a tenant of a cloud computing platform subscribed to a first service to subscribe to a second service.

In one implementation of the foregoing computer-readable storage medium, the neural network model is a deep recommendation model.

In one implementation of the foregoing computer-readable storage medium, the clustering algorithm comprises: a dynamic time warping algorithm; a shapelet-based time series clustering algorithm; a time series embedding clustering algorithm; or a spectral clustering algorithm.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

For example, running examples have been described with respect to data subjects as partner organizations of a cloud service provider, analyzing time series data representing revenue of the partner organizations, and generating investment recommendations for the partner organizations. However, it is also contemplated herein that recommendation systems may generate recommendations for other types of data subjects. For instance, a recommendation system may generate recommendations for a computing device (e.g., a recommendation to install an application, a recommendation to modify or change a hardware component, a recommendation to modify a configuration of an operating system, etc.) based on time series data representing performance of the computing device and other computing devices over time. As another non-limiting example, a recommendation system may generate recommendations for an instance of an application (e.g., configuration settings of the application, user preferences of the application, updates to the application) based on time series data representing performance of the application and/or other instances of (e.g., the same type of, similar types of, and/or other types of) applications over time.

Further still, examples of recommendation systems have been described herein as generating recommendations including actionable insights associated with a data subject. In several examples, the recommendations are generated for transmission to a computing device and display in a user interface. It is also contemplated herein that a recommendation may include instructions for (e.g., automatically) implementing an action associated with the actionable insight. For instance, a recommendation for a computing device may include instructions for installing a software update, updating a driver, installing an application, updating an operating system, modifying a configuration setting of an operating system or application, and/or otherwise modifying software and/or settings of the computing device (or a component thereof). In this context, computing device may automatically perform the action in response to receiving the recommendation. In another non-limiting example embodiment, an admin computing device of a cloud service provider receives a recommendation to modify settings and/or configurations associated with the cloud service, subscribers to the cloud service, and/or the like. In this context, the admin computing device may (e.g., automatically) perform actions to implement the recommendation.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A computer-implemented method for generating recommendations performed by a first computing device, comprising:

receiving a plurality of sets of time series data comprising:

a first set of time series data corresponding to performance of a second computing device associated with a first data subject of a plurality of data subjects, and a second set of time series data corresponding to performance of a third computing device associated with a second data subject of the plurality of data subjects;

segmenting the plurality of data subjects into groups according to a clustering algorithm applied to the sets of time series data, a first group of the groups comprising the first data subject and the second data subject;

for the first group of the groups, determining implicit ratings for a subset of data subjects segmented into the first group, the implicit ratings indicating a performance of a respective data subject in the first group with respect to performances of other data subjects in the first group;

utilizing a neural network model to:

determine a difference in operation between the first data subject and the second data subject, the second data subject having a higher implicit rating than the first data subject, and generate a recommendation for the first data subject based on the determined difference, the recommendation comprising instructions for automatically implementing an action of an actionable insight associated with the first data subject and configured to mitigate the determined difference; and automatically performing, by the first computing device and according to the instructions, the action of the actionable insight to automatically improve a performance of the second computing device based on mitigation of the determined difference.

2. The computer-implemented method of claim 1, wherein the plurality of data subjects comprises:

an organization;

an application; or the second computing device.

3. The computer-implemented method of claim 1, wherein said determining implicit ratings for the subset of data subjects segmented into the first group comprises:

determining a triplet for each data subject of the subset of data subjects, the triplet comprising an identifier for the data subject, a data item, and the implicit rating determined for the data subject.

4. The computer-implemented method of claim 1, wherein said utilizing the neural network model to determine the difference in operation between the first data subject and the second data subject comprises causing the neural network model to:

determine that a level of similarity between the first data subject and the second data subject segmented into the first group meets a threshold condition; and identify a data item that is associated with the second data subject and not associated with the first data subject, and wherein the action of the actionable insight is configured to mitigate the determined difference based on the identified data item.

5. The computer-implemented method of claim 4, wherein the data item comprises at least one of:

region information;

industry information;

service information; or device information.

6. The computer-implemented method of claim 4, wherein said causing the neural network model to determine that a level of similarity between the first data subject and the second data subject meets the threshold condition comprises causing the neural network model to determine at least one of:

matching region information associated with the first data subject and the second data subject;

matching industry information associated the first data subject and the second data subject;

the first data subject and the second data subject are subscribed to the same service; or the first data subject and the second data subject are associated with the same type of device hardware.

7. The computer-implemented method of claim 1, wherein said utilizing the neural network model to generate the recommendation comprises utilizing the neural network model:

identify a potential computing device performance improvement to the second computing device based on the determined difference; and determine the action of the actionable insight, wherein performance of the action implements the potential computing device performance improvement to cause improvement in performance of the second computing device.

8. The computer-implemented method of claim 1, wherein the neural network model is a deep recommendation model.

9. The computer-implemented method of claim 1, wherein the clustering algorithm comprises:

a dynamic time warping algorithm;

a shapelet-based time series clustering algorithm;

a time series embedding clustering algorithm; or a spectral clustering algorithm.

10. A recommendation system, comprising:

a processor circuit; and a memory that stores program code that is executable by the processor circuit, the program code comprising:

a clustering service that:

receives a plurality of sets of time series data comprising a first set of time series data corresponding to a first data subject of a plurality of data subjects and a second set of time series data corresponding to a second data subject of the plurality of data subjects, segments a subset of the data subjects into a first group according to a clustering algorithm applied to at least the first set of time series data and the second set of time series data, the subset of the data subjects comprising the first data subject and the second data subject, and for the first group, determines implicit ratings for the subset of data subjects, the implicit ratings indicating a performance of a data subject in the first group with respect to performances of other data subjects in the first group; and a recommendation service that:

uses a neural network model to:

determine a difference in operation between the first data subject of the first group and the second data subject of the first group, the second data subject having a higher implicit rating than the first data subject, and generate a recommendation for the first data subject based on the determined difference, the recommendation comprising instructions for automatically implementing an action of an actionable insight associated with the first data subject and configured to mitigate the determined difference, and based on the recommendation, automatically transmits the instructions to a first computing device associated with the first data subject, the instructions causing the first computing device to automatically implement the action of the actionable insight to automatically improve a performance of the first computing device based on mitigation of the determined difference.

11. The recommendation system of claim 10, wherein the plurality of data subjects comprises:

an organization;

an application; or the first computing device.

12. The recommendation system of claim 10, wherein the clustering service determines the implicit ratings for the subset of data subjects by:

determining, for the first data subject, a first triplet comprising an identifier for the first data subject, a first data item, and the implicit rating determined for the first data subject; and determining, for the second data subject, a second triplet comprising an identifier for the second data subject, a second data item, and the implicit rating determined for the second data subject.

13. The recommendation system of claim 10, wherein the recommendation service generates the recommendation for the first data subject by causing the neural network model to:

determine that a level of similarity between the first data subject and the second data subject segmented into the first group meets a threshold condition; and determine a first configuration of a first instance of an application executed by the first computing device is different from a second configuration of a second instance of the application executed by a second computing device associated with the second data subject, determine, based on performance of the second instance of the application being higher than performance of the first instance of the application, to update the first configuration based on the first configuration being different from the second configuration, and wherein the action of the actionable insight is configured to mitigate the determined difference by updating the first configuration based on the first configuration being different from the second configuration.

14. The recommendation system of claim 13, wherein the recommendation service causes the neural network model to determine that the level of similarity between the first data subject and the second data subject meets the threshold condition based on at least one of:

a determination that region information associated with the first data subject matches region information associated with the second data subject;

a determination that industry information associated the first data subject matches industry information associated with the second data subject;

a determination that the first data subject and the second data subject are subscribed to the same service; or a determination that the first data subject and the second data subject are associated with the same type of device hardware.

15. The recommendation system of claim 10, wherein the generated recommendation comprises at least one of:

a recommendation to an organization invested in a first industry to invest in a second industry;

a recommendation to an organization that provides goods or services in a first region to provide goods or services in a second region; or a recommendation to a tenant of a cloud computing platform subscribed to a first service to subscribe to a second service.

16. The recommendation system of claim 10, wherein the neural network model is a deep recommendation model.

17. A non-transitory computer-readable storage medium having computer program logic recorded thereon that when executed by a processor circuit causes the processor circuit to perform a method comprising:

receiving a plurality of sets of time series data comprising:

a first set of time series data corresponding to performance of a first computing device associated with a first data subject of a plurality of data subjects, and a second set of time series data corresponding to performance of a second computing device associated with a second data subject of the plurality of data subjects;

segmenting the plurality of data subjects into groups according to a clustering algorithm applied to the sets of time series data, a first group of the groups comprising the first data subject and the second data subject;

for the first group, determining implicit ratings for a subset of data subjects segmented into the first group, the implicit ratings indicating a performance of a data subject in the first group with respect to performances of other data subjects in the first group;

utilizing a neural network model to:

determine a difference in operation between the first data subject and the second data subject, the second data subject having a higher implicit rating than the first data subject, and generate a recommendation for the first data subject based on the determined difference, the recommendation comprising instructions for automatically implementing an action of an actionable insight associated with the first data subject and configured to mitigate the determined difference; and automatically performing, according to the instructions, the action of the actionable insight to automatically improve a performance of the first computing device based on mitigation of the determined difference.

18. The non-transitory computer-readable storage medium of claim 17, wherein the plurality of data subjects comprises:

an organization;

an application; or the second computing device.

19. The non-transitory computer-readable storage medium of claim 17, wherein said utilizing the neural network model to determine the difference in operation between the first data subject and the second data subject comprises causing the neural network model to:

determine that a level of similarity between the first data subject and the second data subject segmented into the first group meets a threshold condition; and determine a first configuration in an operating system of the first computing device is different from a second configuration in an operating system of the second computing device, determine, based on performance of the operating system of the second computing device being higher than performance of the operating system of the first computing device, to modify the first configuration based on the first configuration being different from the second configuration, and wherein the action of the actionable insight is configured to mitigate the determined difference by modifying the first configuration based on the first configuration being different from the second configuration.

20. The recommendation system of claim 10, wherein the recommendation service uses the neural network model to generate the recommendation by using the neural network model to:

identify a potential computing device performance improvement to the first computing device based on the determined difference; and determine the action of the actionable insight, wherein performance of the action implements the potential computing device performance improvement to cause improvement in performance of the first computing device.

* * * * *